US012695797B2

(12) United States Patent
Ma et al.

(10) Patent No.: US 12,695,797 B2
(45) Date of Patent: Jul. 28, 2026

(54) MEDIA COMMUNICATIONS FOR WEARABLE DEVICES

(71) Applicant: QUALCOMM Incorporated, San Diego, CA (US)

(72) Inventors: Liangping Ma, San Diego, CA (US); Nikolai Konrad Leung, San Francisco, CA (US); Louis Joseph Kerofsky, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/327,829

(22) Filed: Jun. 1, 2023

(65) Prior Publication Data

US 2024/0406228 A1     Dec. 5, 2024

(51) Int. Cl.
H04L 65/1089      (2022.01)
H04L 65/1101      (2022.01)
H04W 76/10       (2018.01)

(52) U.S. Cl.
CPC ...... H04L 65/1089 (2013.01); H04L 65/1101 (2022.05); H04W 76/10 (2018.02)

(58) Field of Classification Search
CPC . H04L 65/1089; H04L 65/1101; H04W 76/10
See application file for complete search history.

(56) References Cited

U.S. PATENT DOCUMENTS

| | | | |
|---|---|---|---|
| 8,659,590 B1* | 2/2014 | Stam | G06T 19/00 463/36 |
| 2017/0054777 A1* | 2/2017 | Leung | H04L 65/75 |
| 2018/0136461 A1* | 5/2018 | Fitzgerald | G06F 3/012 |
| 2020/0162698 A1 | 5/2020 | Rakshit et al. | |
| 2023/0222741 A1* | 7/2023 | Gruen | G06F 3/011 345/633 |

OTHER PUBLICATIONS

Stereoscopy ("Stereoscopy", Wikipedia at en.wikipedia.org, Apr. 10, 2023) (Year: 2023).*
International Search Report and Written Opinion—PCT/US2024/029227—ISA/EPO—Aug. 27, 2024 (2303850WO).

* cited by examiner

*Primary Examiner* — Nicholas P Celani
(74) *Attorney, Agent, or Firm* — Holland & Hart LLP

(57)     ABSTRACT
Methods, systems, and devices for wireless communications are described. For example, the described techniques provide for a first wearable device and a second wearable device to initiate media sessions with a user equipment (UE) and an end device. The wearable devices may each initiate a session flow by transmitting session description protocol (SDP) offer messages to the end device. In some examples, the wearable devices may transmit capability information to the UE, and the UE may transmit an SDP offer message to the end device. The end device may begin the session after receiving the one or more SDP offer messages by transmitting one or more SDP answer messages. The wearable devices may each transmit information about a user of the wearable devices. The end device may generate streams of media content, and the UE may cast the streams of media content to the wearable devices.

13 Claims, 20 Drawing Sheets

Wearable Device Manager

Session Flow Initiation Manager

825

Input Module

810

User Information Manager

830

Output Module

815

Media Content Manager

835

820

805

800

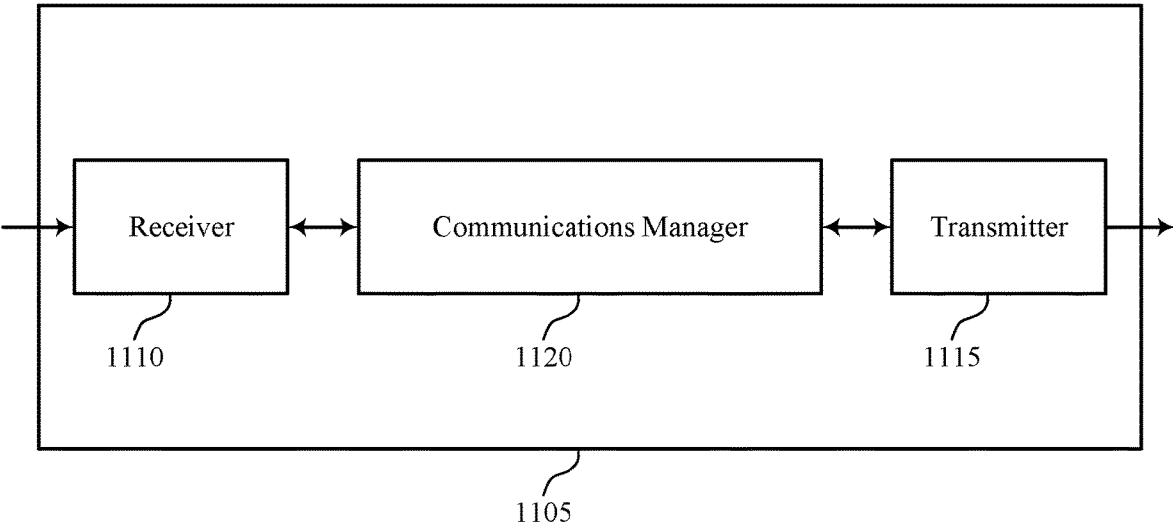
FIG. 11

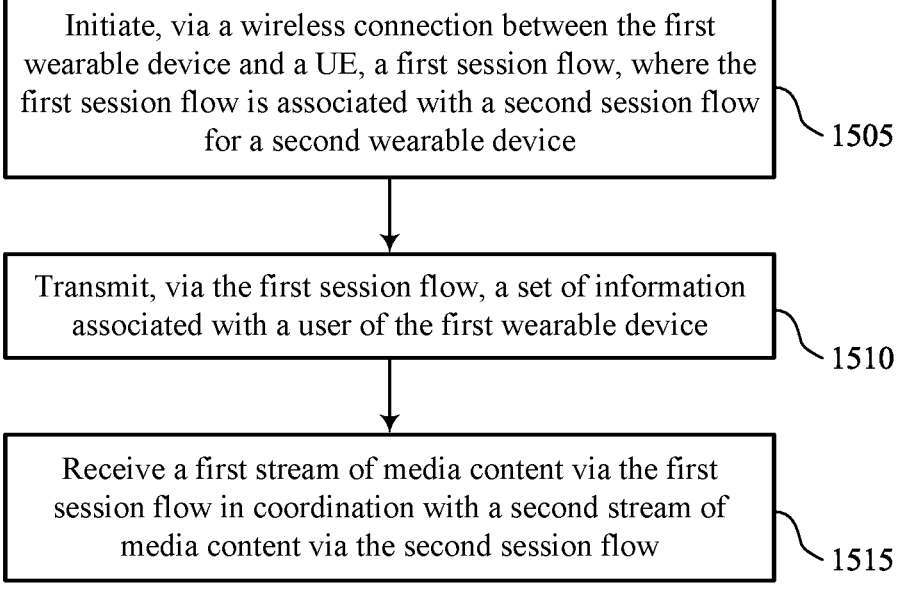

Initiate, via a wireless connection between the first wearable device and a UE, a first session flow, where the first session flow is associated with a second session flow for a second wearable device

1505

Transmit, via the first session flow, a set of information associated with a user of the first wearable device

1510

Receive a first stream of media content via the first session flow in coordination with a second stream of media content via the second session flow

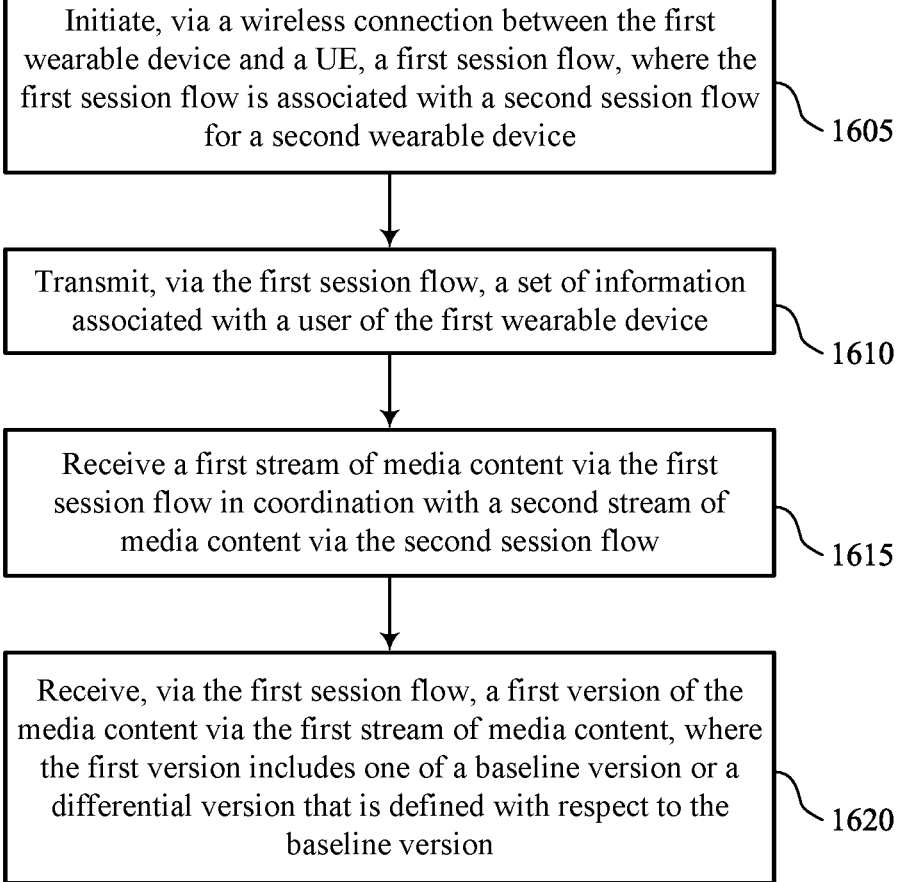

Initiate, via a wireless connection between the first wearable device and a UE, a first session flow, where the first session flow is associated with a second session flow for a second wearable device

1605

Transmit, via the first session flow, a set of information associated with a user of the first wearable device

1610

Receive a first stream of media content via the first session flow in coordination with a second stream of media content via the second session flow

1615

Receive, via the first session flow, a first version of the media content via the first stream of media content, where the first version includes one of a baseline version or a differential version that is defined with respect to the baseline version

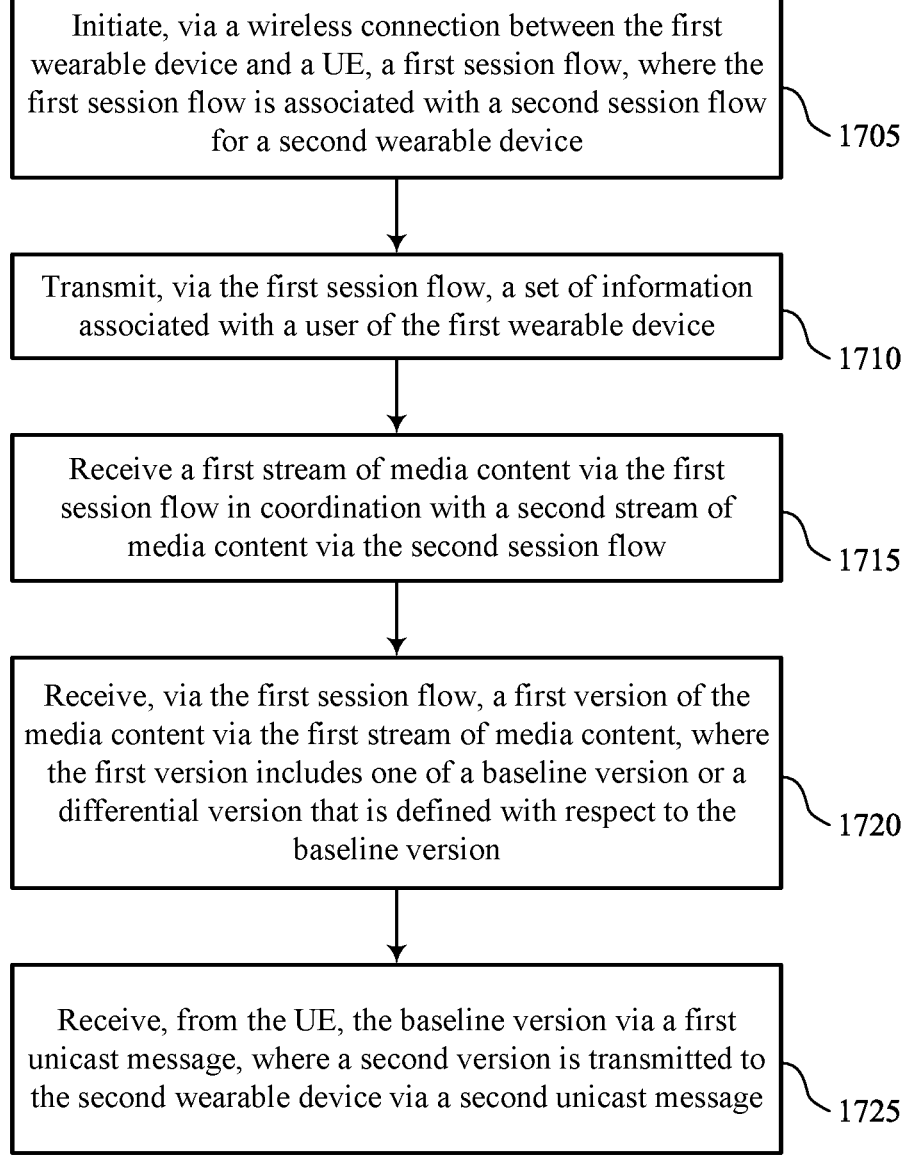

Initiate, via a wireless connection between the first wearable device and a UE, a first session flow, where the first session flow is associated with a second session flow for a second wearable device

1705

Transmit, via the first session flow, a set of information associated with a user of the first wearable device

1710

Receive a first stream of media content via the first session flow in coordination with a second stream of media content via the second session flow

1715

Receive, via the first session flow, a first version of the media content via the first stream of media content, where the first version includes one of a baseline version or a differential version that is defined with respect to the baseline version

1720

Receive, from the UE, the baseline version via a first unicast message, where a second version is transmitted to the second wearable device via a second unicast message

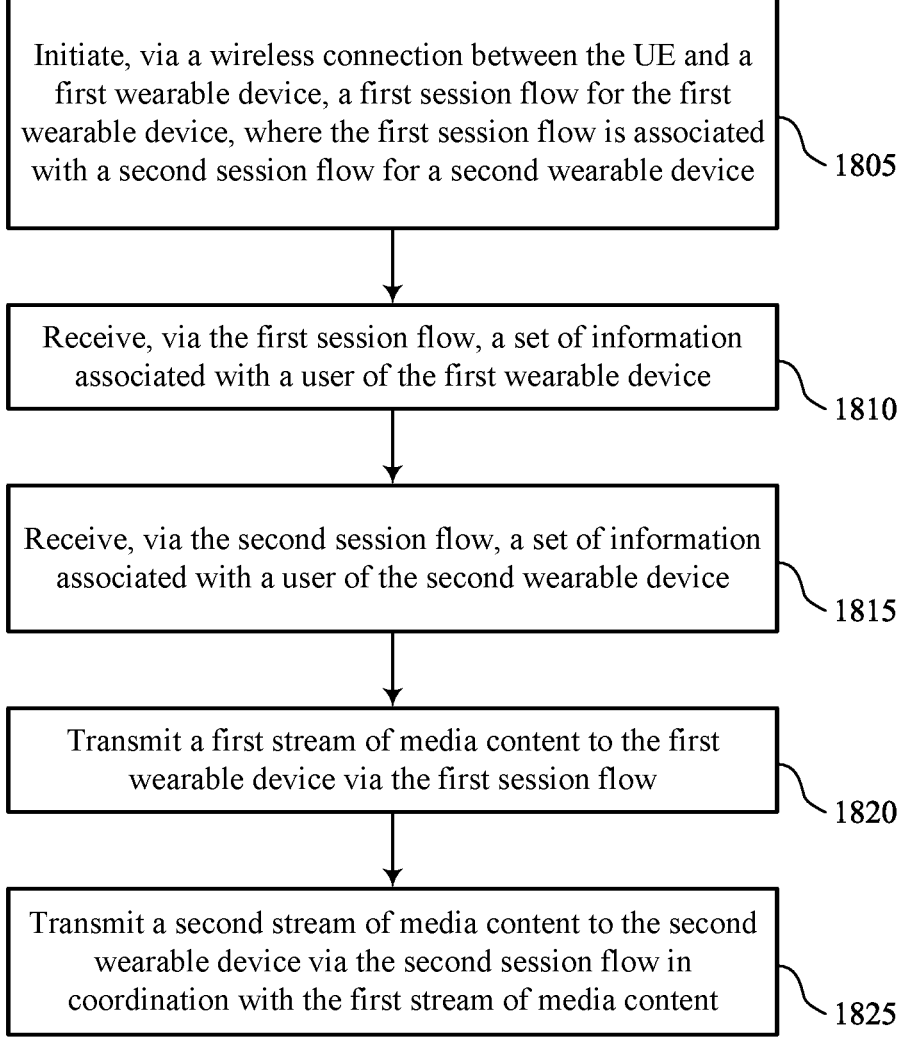

Initiate, via a wireless connection between the UE and a first wearable device, a first session flow for the first wearable device, where the first session flow is associated with a second session flow for a second wearable device

1805

Receive, via the first session flow, a set of information associated with a user of the first wearable device

1810

Receive, via the second session flow, a set of information associated with a user of the second wearable device

1815

Transmit a first stream of media content to the first wearable device via the first session flow

1820

Transmit a second stream of media content to the second wearable device via the second session flow in coordination with the first stream of media content

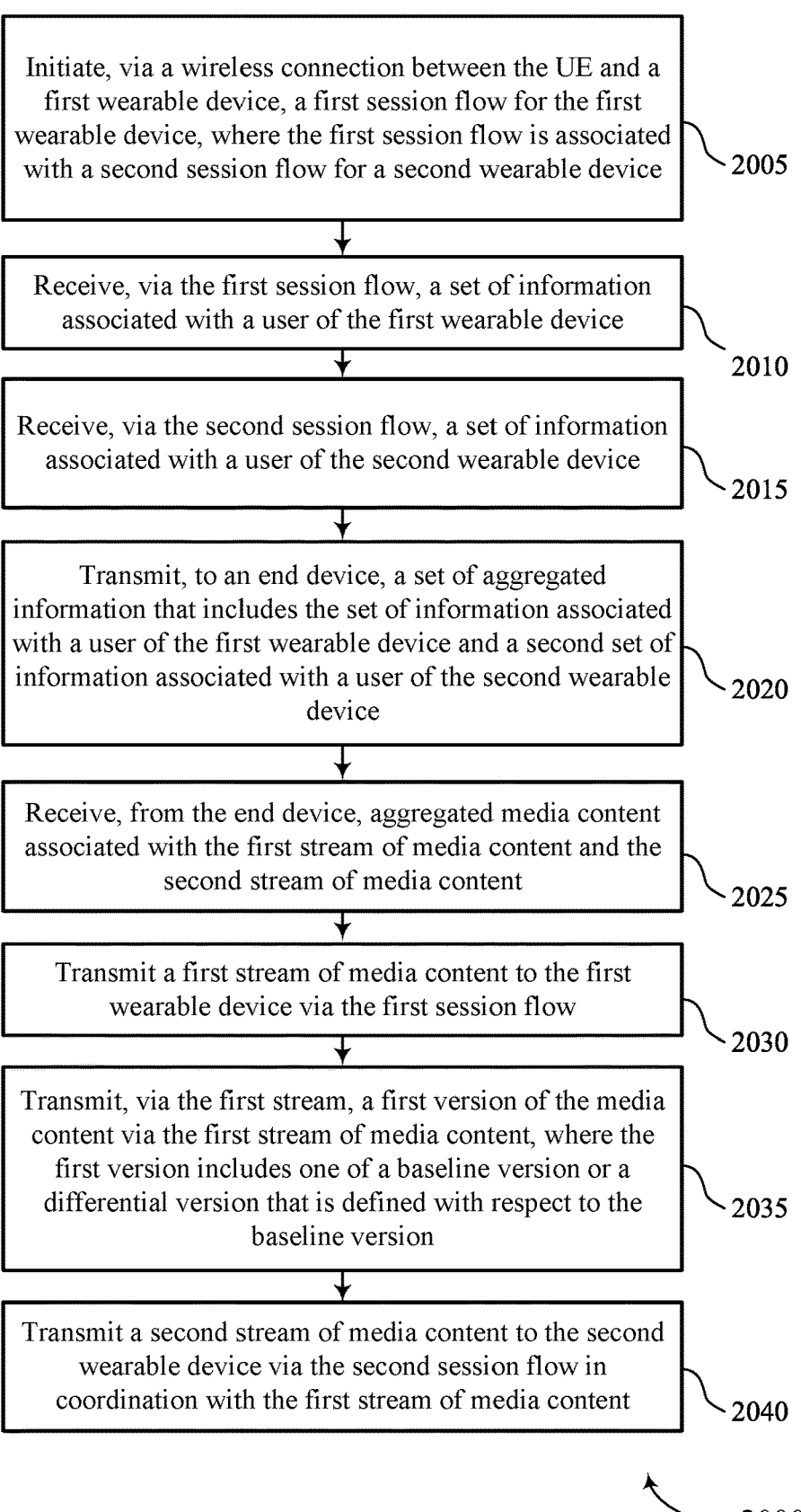

Initiate, via a wireless connection between the UE and a first wearable device, a first session flow for the first wearable device, where the first session flow is associated with a second session flow for a second wearable device ⟩ 2005

Receive, via the first session flow, a set of information associated with a user of the first wearable device ⟩ 2010

Receive, via the second session flow, a set of information associated with a user of the second wearable device ⟩ 2015

Transmit, to an end device, a set of aggregated information that includes the set of information associated with a user of the first wearable device and a second set of information associated with a user of the second wearable device ⟩ 2020

Receive, from the end device, aggregated media content associated with the first stream of media content and the second stream of media content ⟩ 2025

Transmit a first stream of media content to the first wearable device via the first session flow ⟩ 2030

Transmit, via the first stream, a first version of the media content via the first stream of media content, where the first version includes one of a baseline version or a differential version that is defined with respect to the baseline version ⟩ 2035

Transmit a second stream of media content to the second wearable device via the second session flow in coordination with the first stream of media content ⟩ 2040

MEDIA COMMUNICATIONS FOR WEARABLE DEVICES

FIELD OF TECHNOLOGY

The following relates to wireless communications, including media communications for wearable devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support media communications for wearable devices. For example, the described techniques provide for a first wearable device and a second wearable device to initiate media sessions with a user equipment (UE) and an end device. In some implementations, the first wearable device and the second wearable device (e.g., a pair of contact lenses) may each initiate a session flow (e.g., a real-time transport protocol (RTP) session) by transmitting a session description protocol (SDP) offer message to the end device. In some examples, the first wearable device and the second wearable device may transmit capability information to the UE, and the UE may transmit an SDP offer message to the end device. The end device may begin the session after receiving the one or more SDP offer messages by transmitting one or more SDP answer messages. The first wearable device and the second wearable device may each transmit information about the user (e.g., pose or eye tracking information) to the end device (e.g., or to the UE to be forwarded to the end device). The end device may generate a first stream of media content and a second stream of media content (e.g., rendered videos for display by the first wearable device and the second wearable device) for the first wearable device and the second wearable device, respectively, and transmit the media content to the UE. The UE may unicast each stream of media content to the first wearable device and the second wearable device, respectively. In some examples, the UE may groupcast the first stream of media content to the first wearable device and the second wearable device and may unicast a differential version (e.g., between the first stream of media content and the second stream of media content) to one of the first wearable device and the second wearable device.

A method for wireless communications at a first wearable device is described. The method may include initiating, via a wireless connection between the first wearable device and a UE, a first session flow, where the first session flow is associated with a second session flow for a second wearable device, transmitting, via the first session flow, a set of information associated with a user of the first wearable device, and receiving a first stream of media content via the first session flow in coordination with a second stream of media content via the second session flow.

An apparatus for wireless communications at a first wearable device is described. The apparatus may include at least one processor, at least one memory coupled with the at least one processor, and instructions stored in the at least one memory. The instructions may be executable by the at least one processor to cause the apparatus to initiate, via a wireless connection between the first wearable device and a UE, a first session flow, where the first session flow is associated with a second session flow for a second wearable device, transmit, via the first session flow, a set of information associated with a user of the first wearable device, and receive a first stream of media content via the first session flow in coordination with a second stream of media content via the second session flow.

Another apparatus for wireless communications at a first wearable device is described. The apparatus may include means for initiating, via a wireless connection between the first wearable device and a UE, a first session flow, where the first session flow is associated with a second session flow for a second wearable device, means for transmitting, via the first session flow, a set of information associated with a user of the first wearable device, and means for receiving a first stream of media content via the first session flow in coordination with a second stream of media content via the second session flow.

A non-transitory computer-readable medium storing code for wireless communications at a first wearable device is described. The code may include instructions executable by at least one processor to initiate, via a wireless connection between the first wearable device and a UE, a first session flow, where the first session flow is associated with a second session flow for a second wearable device, transmit, via the first session flow, a set of information associated with a user of the first wearable device, and receive a first stream of media content via the first session flow in coordination with a second stream of media content via the second session flow.

In some examples of the method, apparatuses, and non-transitory computer-readable medium described herein, receiving the first stream of media content may include operations, features, means, or instructions for receiving, via the first session flow, a first version of the media content via the first stream of media content, where the first version includes one of a baseline version or a differential version that may be defined with respect to the baseline version.

In some examples of the method, apparatuses, and non-transitory computer-readable medium described herein, the second stream of media content may be associated with a second version of the media content, the second version including the other of the baseline version or the differential version.

In some examples of the method, apparatuses, and non-transitory computer-readable medium described herein, the baseline version may be groupcast to the first wearable device and the second wearable device and the differential version may be unicast to one of the first wearable device or the second wearable device.

In some examples of the method, apparatuses, and non-transitory computer-readable medium described herein, receiving the first stream of media content may include operations, features, means, or instructions for receiving, from the UE, the baseline version via a first unicast message, where a second version may be transmitted to the second wearable device via a second unicast message.

In some examples of the method, apparatuses, and non-transitory computer-readable medium described herein, the first session flow and the second session flow may be associated with a same session between the UE and an end device.

In some examples of the method, apparatuses, and non-transitory computer-readable medium described herein, the first session flow may be associated with a first session with an end device and the first session may be different from a second session with the end device associated with the second session flow.

In some examples of the method, apparatuses, and non-transitory computer-readable medium described herein, the method, apparatuses, and non-transitory computer-readable medium may include further operations, features, means, or instructions for transmitting, to the UE, a capability message indicating a capability of the first wearable device to receive the first stream of media content and transmitting, to an end device, a SDP offer message and receiving, from the end device, a SDP answer message based on the SDP offer message.

In some examples of the method, apparatuses, and non-transitory computer-readable medium described herein, the set of information associated with the user includes one or more of pose information and eye tracking information.

In some examples of the method, apparatuses, and non-transitory computer-readable medium described herein, the first wearable device and the second wearable device may be contact lenses.

In some examples of the method, apparatuses, and non-transitory computer-readable medium described herein, the media content includes rendered video for display by the first wearable device in coordination with the second wearable device.

A method for wireless communications at a UE is described. The method may include initiating, via a wireless connection between the UE and a first wearable device, a first session flow for the first wearable device, where the first session flow is associated with a second session flow for a second wearable device, receiving, via the first session flow, a set of information associated with a user of the first wearable device, receiving, via the second session flow, a set of information associated with a user of the second wearable device, transmitting a first stream of media content to the first wearable device via the first session flow, and transmitting a second stream of media content to the second wearable device via the second session flow in coordination with the first stream of media content.

An apparatus for wireless communications at a UE is described. The apparatus may include at least one processor, at least one memory coupled with the at least one processor, and instructions stored in the at least one memory. The instructions may be executable by the at least one processor to cause the apparatus to initiate, via a wireless connection between the UE and a first wearable device, a first session flow for the first wearable device, where the first session flow is associated with a second session flow for a second wearable device, receive, via the first session flow, a set of information associated with a user of the first wearable device, receive, via the second session flow, a set of information associated with a user of the second wearable device, transmit a first stream of media content to the first wearable device via the first session flow, and transmit a second stream of media content to the second wearable device via the second session flow in coordination with the first stream of media content.

Another apparatus for wireless communications at a UE is described. The apparatus may include means for initiating, via a wireless connection between the UE and a first wearable device, a first session flow for the first wearable device, where the first session flow is associated with a second session flow for a second wearable device, means for receiving, via the first session flow, a set of information associated with a user of the first wearable device, means for receiving, via the second session flow, a set of information associated with a user of the second wearable device, means for transmitting a first stream of media content to the first wearable device via the first session flow, and means for transmitting a second stream of media content to the second wearable device via the second session flow in coordination with the first stream of media content.

A non-transitory computer-readable medium storing code for wireless communications at a UE is described. The code may include instructions executable by at least one processor to initiate, via a wireless connection between the UE and a first wearable device, a first session flow for the first wearable device, where the first session flow is associated with a second session flow for a second wearable device, receive, via the first session flow, a set of information associated with a user of the first wearable device, receive, via the second session flow, a set of information associated with a user of the second wearable device, transmit a first stream of media content to the first wearable device via the first session flow, and transmit a second stream of media content to the second wearable device via the second session flow in coordination with the first stream of media content.

Some examples of the method, apparatuses, and non-transitory computer-readable medium described herein may further include operations, features, means, or instructions for transmitting, to an end device, a set of aggregated information that includes the set of information associated with the user of the first wearable device and a second set of information associated with the user of the second wearable device and receiving, from the end device, aggregated media content associated with the first stream of media content and the second stream of media content.

In some examples of the method, apparatuses, and non-transitory computer-readable medium described herein, transmitting the first stream of media content may include operations, features, means, or instructions for transmitting, via the first stream, a first version of the media content via the first stream of media content, where the first version includes one of a baseline version or a differential version that may be defined with respect to the baseline version.

In some examples of the method, apparatuses, and non-transitory computer-readable medium described herein, the second stream of media content may be associated with a second version of the media content, the second version including the other of the baseline version or the differential version.

In some examples of the method, apparatuses, and non-transitory computer-readable medium described herein, the baseline version may be groupcast to the first wearable device and the second wearable device and the differential version may be unicast to one of the first wearable device or the second wearable device.

Some examples of the method, apparatuses, and non-transitory computer-readable medium described herein may further include operations, features, means, or instructions for receiving, from the end device, an indication of the baseline version and the differential version.

Some examples of the method, apparatuses, and non-transitory computer-readable medium described herein may further include operations, features, means, or instructions for receiving, from the end device, an indication of the baseline version and a second version of the media content and generating the differential version based on receiving the indication.

In some examples of the method, apparatuses, and non-transitory computer-readable medium described herein, transmitting the first stream of media content may include operations, features, means, or instructions for transmitting the baseline version to the first wearable device via a first unicast message and transmitting a second version of the media content to the second wearable device via a second unicast message.

In some examples of the method, apparatuses, and non-transitory computer-readable medium described herein, initiating the first session flow may include operations, features, means, or instructions for receiving, from the first wearable device, a first capability message indicating a capability of the first wearable device to receive the first stream of media content, receiving, from the second wearable device, a second capability message indicating a capability of the second wearable device to receive the second stream of media content, transmitting, to an end device, a SDP offer message based on the first capability message and the second capability message, and receiving, from the end device, a SDP answer message based on the SDP offer message.

In some examples of the method, apparatuses, and non-transitory computer-readable medium described herein, the first session flow and the second session flow may be associated with a same session between the UE and an end device.

In some examples of the method, apparatuses, and non-transitory computer-readable medium described herein, the set of information associated with the user includes one or more of pose information and eye tracking information.

In some examples of the method, apparatuses, and non-transitory computer-readable medium described herein, the first wearable device and the second wearable device may be contact lenses.

In some examples of the method, apparatuses, and non-transitory computer-readable medium described herein, the media content includes rendered video for display by the first wearable device in coordination with the second wearable device.

BRIEF DESCRIPTION OF THE DRAWINGS

FIGS. 11 and 12 show block diagrams of devices that support media communications for wearable devices in accordance with one or more aspects of the present disclosure.

FIGS. 15 through 20 show flowcharts illustrating methods that support media communications for wearable devices in accordance with one or more aspects of the present disclosure.

DETAILED DESCRIPTION

Figure 1:
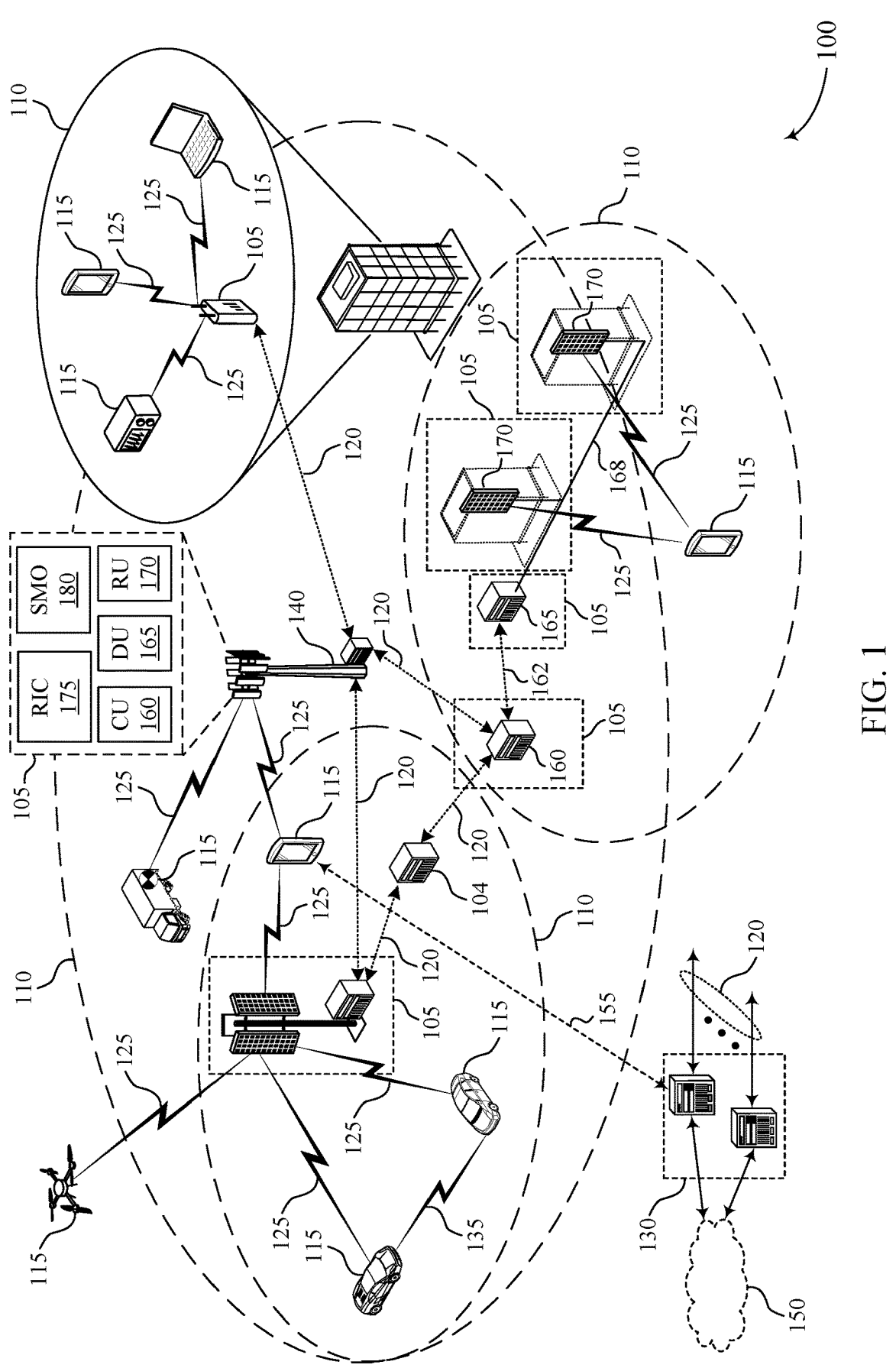
FIG. 1 shows an example of a wireless communications system that supports media communications for wearable devices in accordance with one or more aspects of the present disclosure.

In some wireless communications systems, a wearable device may receive a stream of media content (e.g., a stream of rendered video content) from a user equipment (UE) for projection to a user of the wearable device. However, some wearable devices (e.g., contact lenses) may include multiple parts (e.g., a right lens and a left lens), and the media content may be different for each lens. Additionally, such wearable devices may have size and hardware constraints, and thus may be unable to coordinate video streams with one another (e.g., directly). Techniques are desired to improve communication setup, procedures, and efficiency for such wearable devices.

In some implementations, a first wearable device and a second wearable device (e.g., a pair of contact lenses) may each initiate a session flow (e.g., a real-time transport protocol (RTP) session) by transmitting a session description protocol (SDP) offer message to an end device, which may be an application server. For example, the wearable devices may transmit the SDP offer message based on receiving a command from a user. The end device may begin the session after receiving both SDP offer messages by transmitting SDP answer messages. The first wearable device and the second wearable device may each transmit information about the user (e.g., pose or eye tracking information for cases in which the first wearable device and the second wearable device are contact lenses) to the end device. The end device may generate a first stream of media content and a second stream of media content (e.g., rendered videos for display by the first wearable device and the second wearable device) for the first wearable device and the second wearable device, respectively, and transmit the media content to a UE. The UE may unicast each stream of media content to the first wearable device and the second wearable device, respectively.

In some implementations, the first wearable device and the second wearable device may each initiate a session flow (e.g., an RTP session) by transmitting a capability message to the UE including a media capability of the first wearable device and the second wearable device, respectively. The UE may transmit an SDP offer message to the end device and receive an SDP answer from the end device. The contact lenses may each transmit user information (e.g., pose or eye tracking information for cases in which the first wearable device and the second wearable device are contact lenses) to the UE, which may in turn transmit aggregated user information to the end device. The end device may indicate each stream of media content to the UE, or may indicate a first version of the media content and a differential version between the first version of the media content and a second version of the media content to the UE. Alternatively, the UE may receive each version of the media content and determine (e.g., generate) the differential version. The UE may unicast each version of the media content to the first wearable device and the second wearable device, respectively. Alternatively, the UE may groupcast the first version of the media content to both of the first wearable device and the second wearable device, and may unicast the differential version of the media content to one of the first wearable device and the second wearable device.

Aspects of the disclosure are initially described in the context of wireless communications systems. Aspects of the disclosure are further illustrated by and described with reference to process flow diagrams. Aspects of the disclosure are further illustrated by and described with reference to apparatus diagrams, system diagrams, and flowcharts that relate to media communications for wearable devices.

FIG. 1 shows an example of a wireless communications system 100 that supports media communications for wearable devices in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support media communications for wearable devices as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO)

communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some implementations, a first wearable device and a second wearable device (e.g., a pair of contact lenses, a pair of earbuds, a pair of biofeedback devices, a pair of game control devices, or other wearable devices) may each initiate a session flow (e.g., an RTP session) by transmitting a SDP offer message to an end device, which may be an application server. For example, the wearable devices may transmit the SDP offer message in response to receiving a command from a user. The end device may begin the session after receiving both SDP offer messages by transmitting SDP answer messages. The first wearable device and the second wearable device may each transmit information about the user (e.g., pose or eye tracking information for cases in which the first wearable device and the second wearable device are contact lenses) to the end device. The end device may generate a first stream of media content and a second stream of media content (e.g., rendered videos for display by the first wearable device and the second wearable device, audio to be played by the first wearable device and the second wearable device, biofeedback or game feedback provided by the first wearable device and the second wearable device, or other media content) for the first wearable device and the second wearable device, respectively, and transmit the media content to a UE 115. The UE 115 may unicast each stream of media content to the first wearable device and the second wearable device, respectively.

In some implementations, the first wearable device and the second wearable device may each initiate a session flow (e.g., an RTP session) by transmitting a capability message to the UE 115 including a media capability of the first wearable device and the second wearable device, respectively. The UE 115 may transmit an SDP offer message to the end device and receive an SDP answer from the end device. The contact lenses may each transmit user information (e.g., pose or eye tracking information, body movement or biometric information, or other feedback for the end device) to the UE 115, which may in turn transmit aggregated user information to the end device. The end device may indicate each stream of media content to the UE 115, or may indicate a first version of the media content and a differential version between the first version of the media content and a second version of the media content to the UE 115. Alternatively, the UE 115 may receive each version of the media content and determine (e.g., generate) the differential version. The UE 115 may unicast each version of the media content to the first wearable device and the second wearable device, respectively. Alternatively, the UE 115 may groupcast the first version of the media content to both of the first wearable device and the second wearable device, and may unicast the differential version of the media content to one of the first wearable device and the second wearable device.

Figure 2:
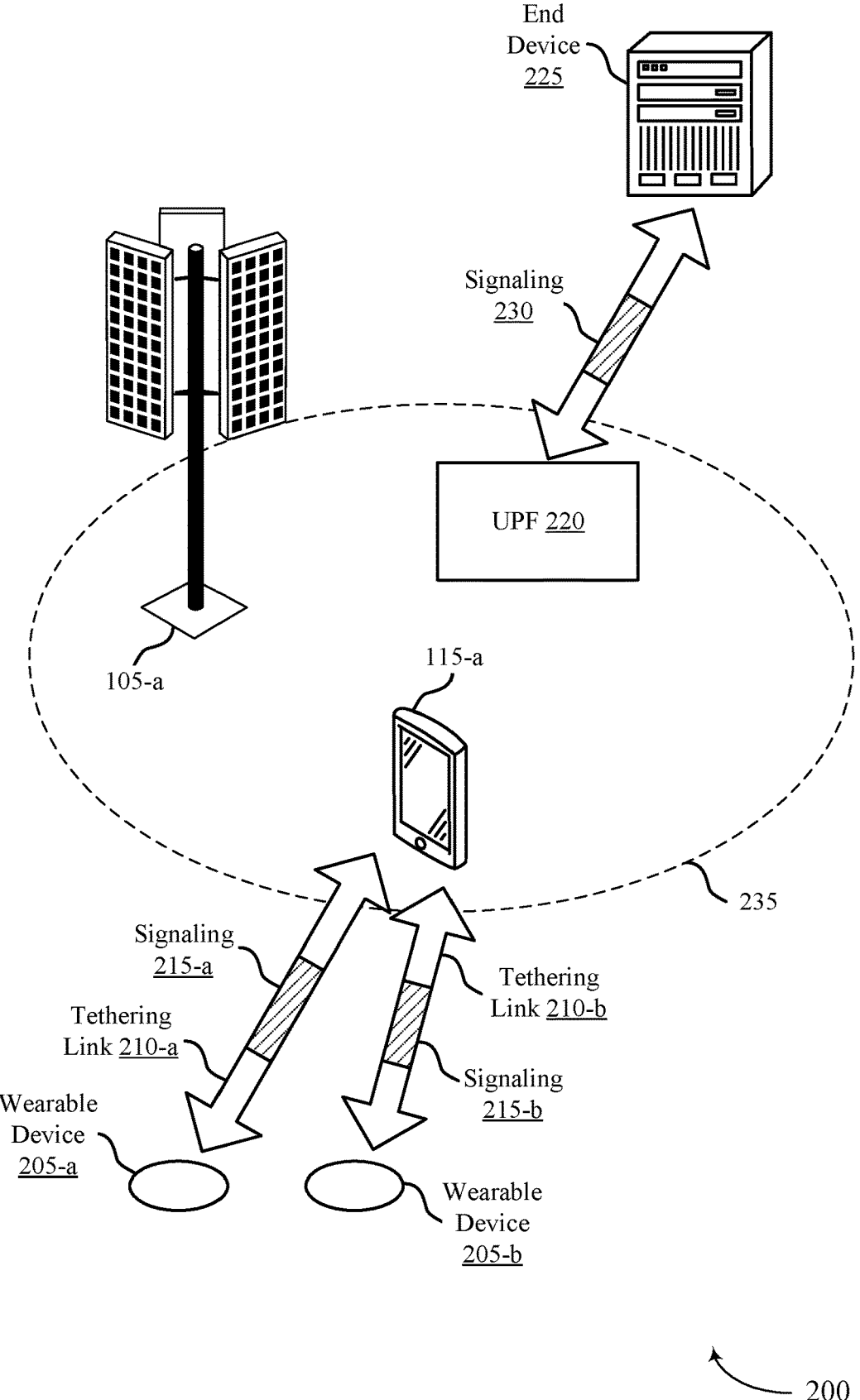
FIG. 2 shows an example of a wireless communications system that supports media communications for wearable devices in accordance with one or more aspects of the present disclosure.

FIG. 2 shows an example of a wireless communications system 200 that supports media communications for wearable devices in accordance with one or more aspects of the present disclosure. The wireless communications system 200 may implement aspects of or may be implemented by aspects of the wireless communications system 100. For example, the wireless communications system 200 may include a UE 115 (e.g., a UE 115-a) and a network entity 105 (e.g., a network entity 105-a), which may be examples of the corresponding devices as described with reference to FIG. 1.

In some examples of the wireless communications system 200, a wearable device 205 may receive a media stream (e.g., a video stream) from a UE 115-a for projection to a user. However, some wearable devices 205 (e.g., contact lenses) may include multiple parts (e.g., a wearable device 205-a and a wearable device 205-b), and therefore the video stream may be different for each of the wearable device 205-a and the wearable device 205-b. In some examples, a first video stream for the wearable device 205-a and a second video stream for the wearable device 205-b may have similar characteristics, and transmitting both video streams in their entirety may decrease efficiency. Additionally, the wearable device 205-a and the wearable device 205-b may have size and hardware constraints, and thus may be unable to coordinate video streams directly with each other in some cases. Accordingly, techniques described herein may improve communication setup, communication procedures, and efficiency for such wearable devices 205.

The wearable device 205-a and the wearable device 205-b may be ambient IoT devices. That is, the wearable device 205-a and the wearable device 205-b may be ultra-low complexity devices with ultra-low power consumption (e.g., battery-less devices). For example, the wearable device 205-a and the wearable device 205-b may have limited or no energy storage capability, and may therefore harvest energy from an external source (e.g., ambient energy). In some examples, the wearable device 205-a and the wearable device 205-b may be unable to recharge or replace energy manually.

In some examples of the wireless communications system 200, the wearable device 205-a may wirelessly communicate signaling 215-a with the UE 115-a over a tethering link 210-a. Similarly, the wearable device 205-b may wirelessly communicate signaling 215-b with the UE 115-a over a tethering link 210-b. The UE 115-a may operate in a cell 235 of a network entity 105-a with a UPF 220. The UE 115-a may accordingly transmit signaling 230 regarding the wearable device 205-*a* and the wearable device 205-*b* to an end device 225 (e.g., an edge application server) via the UPF 220.

In some implementations, the wearable device 205-*a* and the wearable device 205-*b* may each initiate a session flow (e.g., a real-time transport protocol (RTP) session) by each transmitting a session description protocol (SDP) offer message to the end device 225 (e.g., via the tethering link 210-*a* and the tethering link 210-*b*, respectively). For example, the wearable device 205-*a* and the wearable device 205-*b* may each transmit an SDP offer message in response to receiving a command from a user (e.g., a voice command, a hand gesture, or a selection from a menu in a virtual screen projected by the wearable device 205-*a*, the wearable device 205-*b*, or the UE 115-*a*). The end device 225 may begin the session (e.g., after receiving both SDP offer messages) by transmitting an SDP answer message to each of the wearable device 205-*a* and the wearable device 205-*b*. The end device 225 may receive information about the user (e.g., pose or eye tracking information for cases in which the wearable devices 205 are contact lenses) from each of the wearable device 205-*a* and the wearable device 205-*b*. The end device 225 may generate a stream of media content (e.g., a rendered video) for each of the wearable device 205-*a* and the wearable device 205-*b* and transmit the streams of media content to the UE 115-*a*. The UE 115-*a* may unicast the streams of media content to the wearable device 205-*a* and the wearable device 205-*b*, respectively.

In some implementations, the wearable device 205-*a* and the wearable device 205-*b* may each initiate a session flow (e.g., RTP sessions, Layer-3 link sessions, or Layer-2 link sessions) with the UE 115-*a* by transmitting a capability message to the UE 115-*a* over the tethering link 210-*a* and the tethering link 210-*b*. For example, the capability messages may indicate a media capability of the wearable device 205-*a* and the wearable device 205-*b*, respectively (e.g., a capability of the wearable devices 205 to independently receive individual streams of media content from the UE 115-*a*).

The UE 115-*a* may initiate a session flow with the end device 225 by transmitting an SDP offer message to the end device 225 and receiving an SDP answer from the end device 225. The wearable device 205-*a* and the wearable device 205-*b* may each transmit information about the user (e.g., pose or eye tracking information) to the UE 115-*a*, and the UE 115-*a* may transmit aggregated user information to the end device 225, the aggregated user information indicating the information for both wearable devices 205. The end device 225 may indicate each stream of media content (e.g., each rendered video) to the UE 115-*a*, or may indicate a baseline version of the media content (e.g., a first rendered video) and a differential version of the media content (e.g., a delta between the first rendered video and the second rendered video) to the UE 115-*a*.

Alternatively, the UE 115-*a* may receive both streams of media content (e.g., both rendered videos) and may generate the differential version of the media content with respect to the baseline version of the media content. The UE 115-*a* may unicast the respective streams of media content to each of the wearable device 205-*a* and the wearable device 205-*b*. Alternatively, the UE 115-*a* may groupcast the baseline version of the media content to both of the wearable device 205-*a* and the wearable device 205-*b*, and may unicast the differential version of the media content to one of the wearable device 205-*a* and the wearable device 205-*b*. Additional details and examples relating to the session flows between the wearable devices 205 and the end device 225 and the media content transmitted to the wearable devices are shown by and described with reference to FIGS. 3-6.

Figure 3:
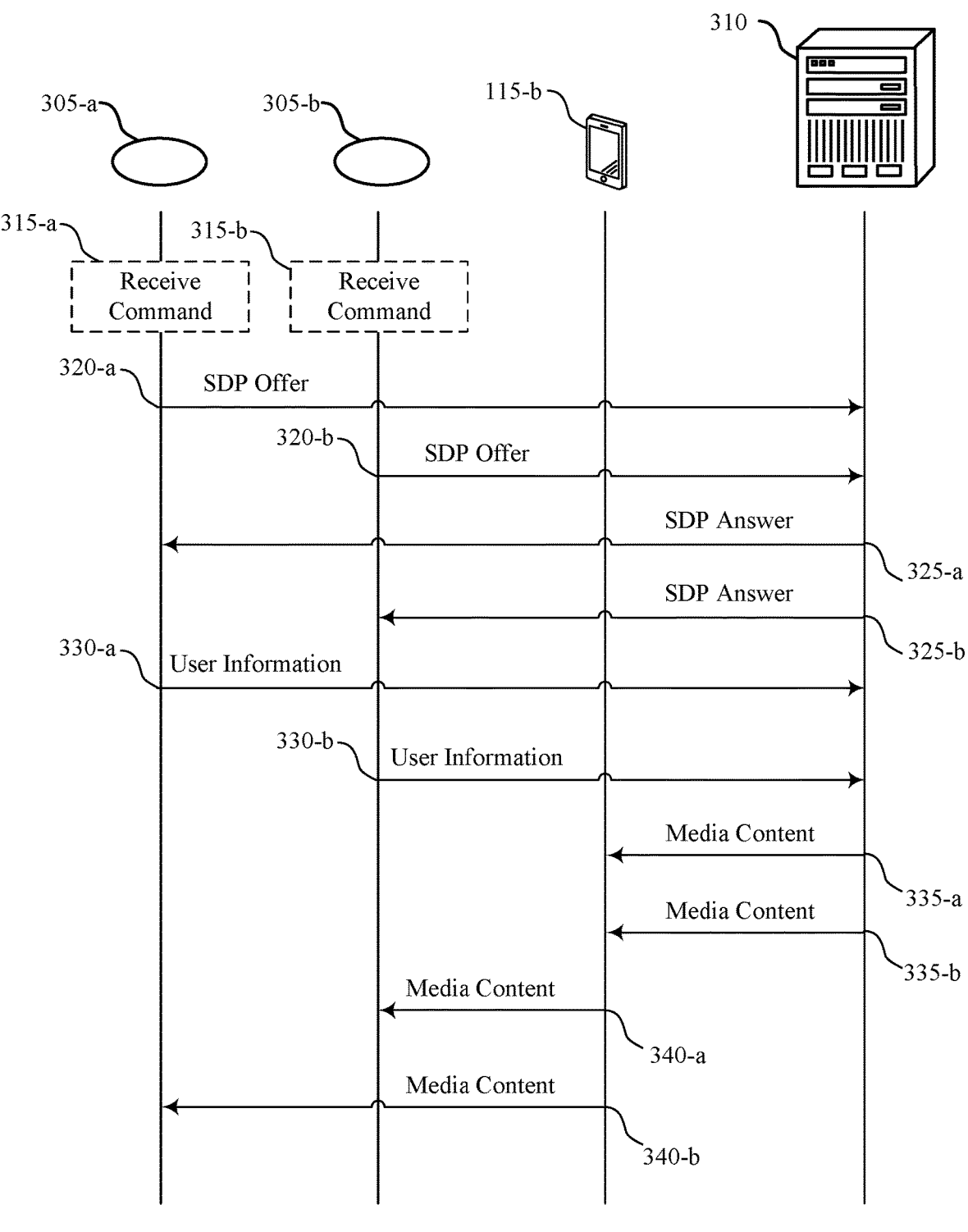
FIG. 3 shows an example of a process flow that supports media communications for wearable devices in accordance with one or more aspects of the present disclosure.

FIG. 3 shows an example of a process flow 300 that supports media communications for wearable devices in accordance with one or more aspects of the present disclosure. The process flow 300 may implement aspects of or may be implemented by aspects of the wireless communications system 100 or the wireless communications system 200. For example, the process flow 300 may include a UE 115-*b*, which may be an example of a UE 115 as described with reference to FIG. 1. The process flow 300 may include a wearable device 305-*a* and a wearable device 305-*b*, which may be examples of contact lenses (e.g., smart contact lenses) or other wearable devices as described with reference to FIG. 2. The process flow 300 may additionally, or alternatively, include an end device 310, which may be an example of an application server as described with reference to FIG. 2.

In the following description of the process flow 300, the operations between the wearable device 305-*a*, the wearable device 305-*b*, the UE 115-*b*, and the end device 310 may be transmitted in a different order than the example order shown. Some operations may also be omitted from the process flow 300, and other operations may be added to the process flow 300. Further, although some operations or signaling may be shown to occur at different times for discussion purposes, these operations may actually occur at the same time.

In some examples, at 315-*a* and 315-*b*, respectively, the wearable device 305-*a* and the wearable device 305-*b* may receive a command from a user (e.g., a voice command, a hand gesture, or a selection from a menu in a virtual screen projected by the wearable device 305-*a*, the wearable device 305-*b*, or the UE 115-*b*) to initiate a first session flow and a second session flow, respectively. In some examples, the command may indicate (e.g., explicitly) information including a destination address, such as a URL or IP address, of the end device 310, a name of an application (e.g., a game), a port number of each of the wearable device 305-*a*, the wearable device 305-*b*, and the end device 310, or a combination thereof. In some examples, the wearable device 305-*a* and the wearable device 305-*b* may derive the information based on an indication in the command.

At 320-*a* and 320-*b*, the wearable device 305-*a* and the wearable device 305-*b*, respectively, may each transmit an SDP offer message to initiate the first session flow and the second session flow (e.g., RTP sessions) with the end device 310. The wearable device 305-*a* and the wearable device 305-*b* may transmit the SDP offer messages via a connection between the wearable device 305-*a* and the UE 115-*b* and a connection between the wearable device 305-*b* and the UE 115-*b*, respectively. The SDP offer messages may indicate, to the end device 310, if the SDP offer is transmitted from the wearable device 305-*a* or the wearable device 305-*b*. The first session flow may be associated with a first session with the end device 310, and the second session flow may be associated with a second session with the end device 310 different from the first session.

At 325-*a* and 325-*b*, the end device 310 may transmit, to the wearable device 205-*a* and the wearable device 205-*b*, respectively, an SDP answer message. The end device 310 may transmit the SDP answer messages after receiving both SDP offer messages (e.g., to synchronize the first session flow and the second session flow). For example, the end device 310 may initiate a timer based on receiving the SDP offer message from the wearable device 305-*a*. If the timer expires before the end device 310 receives the SDP offer message from the wearable device 305-*b*, the end device 310 may transmit, to the wearable device 305-*a* via the SDP answer message, a notification of terminating the session.

At 330-*a* and 330-*b*, the wearable device 305-*a* and the wearable device 305-*b* may transmit, to the end device 310, an indication of a first set of information about the user and a second set of information about the user. The first and second sets of information may include, for example, pose information, eye tracking information, or other information associated with movements or behaviors of the user. For example, the pose information may indicate a physical pose or posture of the user when wearing the wearable devices 305 and the eye tracking information may indicate the user's eye movements when wearing the wearable devices 305. The wearable device 305-*a* may transmit the first set of information via the first session flow and the wearable device 305-*b* may transmit the second set of information via the second session flow.

At 335-*a* and 335-*b*, the end device 310 may transmit, to the UE 115-*b*, a first stream of media content and a second stream of media content (e.g., via the first session flow and the second session flow, respectively). The first stream of media content may include a first version of the media content (e.g., a rendered video for display by the wearable device 305-*a*), and the second stream of media content may include a second version of the media content (e.g., a rendered video for display by the wearable device 305-*b* in coordination with the first rendered video). In some examples, the media content may include other types of video or media.

At 340-*a* and 340-*b*, the UE 115-*b* may transmit the first stream of media content to the wearable device 305-*a* and the second stream of media content to the wearable device 305-*b*, respectively. For example, the UE 115-*b* may transmit the first stream of media content to the wearable device 305-*a* via a first unicast message and the second stream of media content to the wearable device 305-*b* via a second unicast message. The wearable device 305-*a* may project the first rendered video to the user in coordination with the wearable device 305-*b* projecting the second rendered video. That is, the user may view the first and second rendered videos simultaneously or in a specific order via the wearable devices 305.

Figure 4:
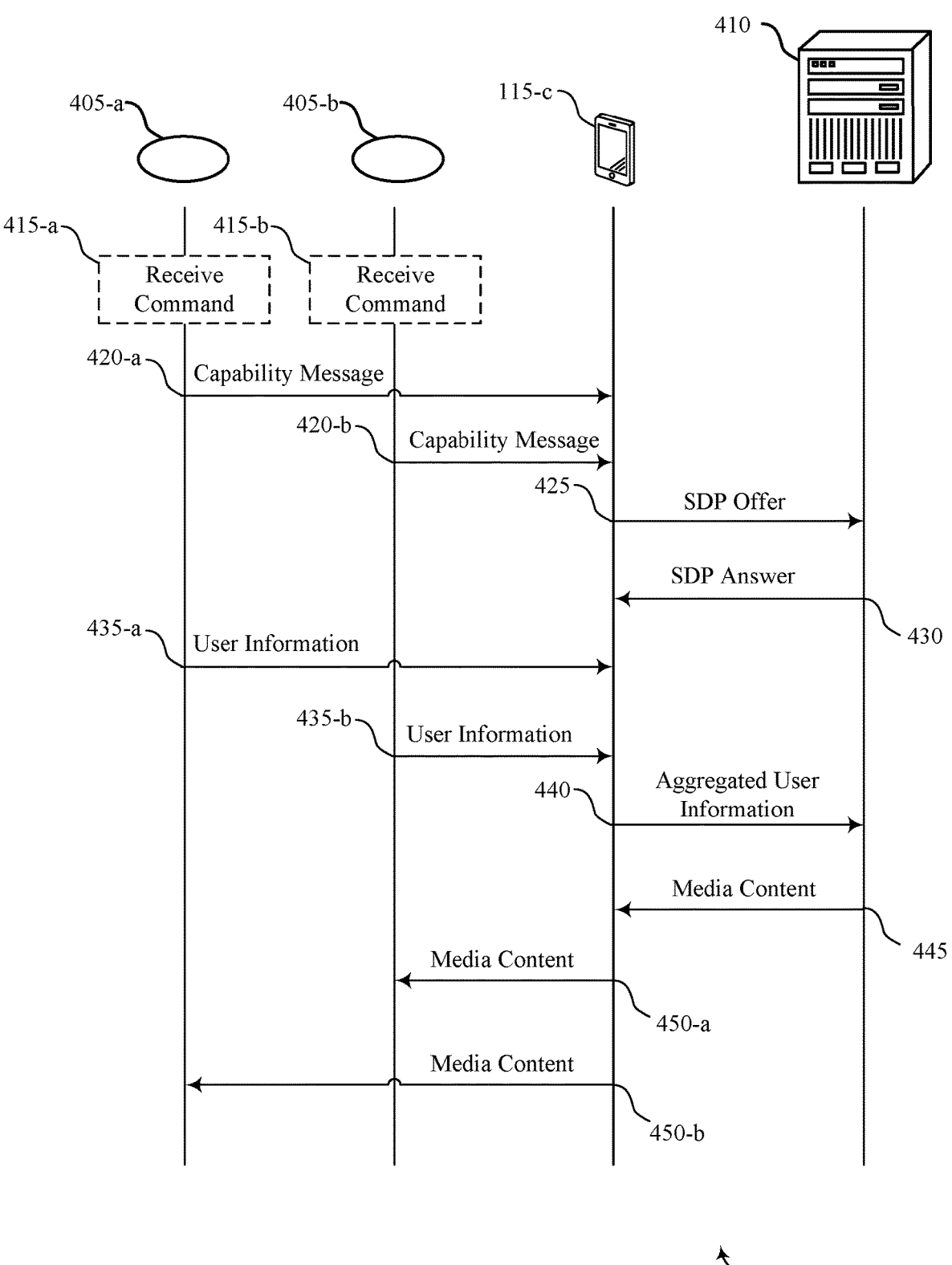
FIG. 4 shows an example of a process flow that supports media communications for wearable devices in accordance with one or more aspects of the present disclosure.

FIG. 4 shows an example of a process flow 400 that supports media communications for wearable devices in accordance with one or more aspects of the present disclosure. The process flow 400 may implement aspects of or may be implemented by aspects of the wireless communications system 100, the wireless communications system 200, or the process flow 300. For example, the process flow 400 may include a UE 115-*c*, which may be an example of a UE 115 as described with reference to FIG. 1. The process flow 400 may include a wearable device 405-*a* and a wearable device 405-*b*, which may be examples of contact lenses (e.g., smart contact lenses) or other wearable devices as described with reference to FIG. 2. The process flow 400 may, additionally, or alternatively, include an end device 410, which may be an example of an application server as described with reference to FIG. 2.

In the following description of the process flow 400, the operations between the wearable device 405-*a*, the wearable device 405-*b*, the UE 115-*c*, and the end device 410 may be transmitted in a different order than the example order shown. Some operations may also be omitted from the process flow 400, and other operations may be added to the process flow 400. Further, although some operations or signaling may be shown to occur at different times for discussion purposes, these operations may actually occur at the same time.

In some examples, at 415-*a* and 415-*b*, respectively, the wearable device 405-*a* and the wearable device 405-*b* may receive a command from a user (e.g., a voice command, a hand gesture, or a selection from a menu in a virtual screen projected by the wearable device 405-*a*, the wearable device 405-*b*, or the UE 115-*c*) to initiate first session flow and a second session flow (e.g., RTP sessions), respectively. In some examples, the command may indicate (e.g., explicitly) information including a destination address, such as a URL or IP address, of the end device 410, a name of an application (e.g., a game), a port number of each of the wearable device 405-*a*, the wearable device 405-*b*, and the end device 410, or a combination thereof. In some examples, the wearable device 405-*a* and the wearable device 405-*b* may derive the information based on an indication in the command.

At 420-*a* and 420-*b*, the wearable device 405-*a* and the wearable device 405-*b* may initiate the first session flow and the second session flow by transmitting, to the UE 115-*c*, a first capability message and a second capability message, respectively. The first capability message and the second capability message may indicate a media capability of the wearable device 405-*a* and the wearable device 405-*b*, respectively. For example, the first capability message may indicate a capability of the wearable device 405-*a* to receive a first stream of media content. The second capability message may indicate a capability of the wearable device 405-*b* to receive a second stream of media content.

At 425, the UE 115-*c* may transmit, to the end device 410, an SDP offer message to initiate a session (e.g., an RTP session) with the end device 410. The SDP offer message may indicate a presence of the wearable device 405-*a* and the wearable device 405-*b*. The UE 115-*c* may transmit the SDP offer message based on receiving the first capability message, the second capability message, or both. In some examples, the UE 115-*c* may initiate the first session flow and the second session flow (e.g., RTP sessions, Layer-3 links, or Layer-2 links) with the wearable device 405-*a* and the wearable device 405-*b*, respectively. The first session flow and the second session flow may each be associated with the session between the UE 115-*c* and the end device 410.

At 430, the UE 115-*c* may receive, from the end device 410, an SDP answer message. The end device 410 may transmit the SDP answer message in response to receiving the SDP offer message.

At 435-*a* and 435-*b*, the wearable device 405-*a* and the wearable device 405-*b* may transmit, to the UE 115-*c*, an indication of a first set of information about the user and a second set of information about the user, respectively. The first set of information and the second set of information may include, for example, pose information, eye tracking information, or both. The wearable device 405-*a* may transmit the first set of information via the first session flow and the wearable device 405-*b* may transmit the second set of information via the second session flow.

At 440, the UE 115-*c* may transmit, to the end device 410, a set of aggregated information about the user. The set of aggregated information may include, for example, the first set of information and the second set of information.

At 445, the end device may transmit, to the UE 115-*c*, a stream of aggregated media content. In some examples, the stream of aggregated media content may include a first version of the media content and a second version of the media content. The first version of the media content may be, for example, a first rendered video for display by the wearable device 405-a. The second version of the media content may be, for example, a second rendered video for display by the wearable device 405-b in coordination with the first version of the media content. In some examples, the media content may include other types of video or media.

At 450-a and 450-b, the UE 115-c may transmit, to the wearable device 405-a and the wearable device 405-b, the first version of the media content and the second version of the media content via the first session flow and the second session flow, respectively. For example, the UE 115-c may transmit the first version of the media content to the wearable device 405-a via a first unicast message. The UE 115-c may transmit the second version of the media content to the wearable device 405-b via a second unicast message. The wearable device 405-a may project the first rendered video to the user in coordination (e.g., simultaneously, at specific times) with the wearable device 405-b projecting the second rendered video.

Figure 5:
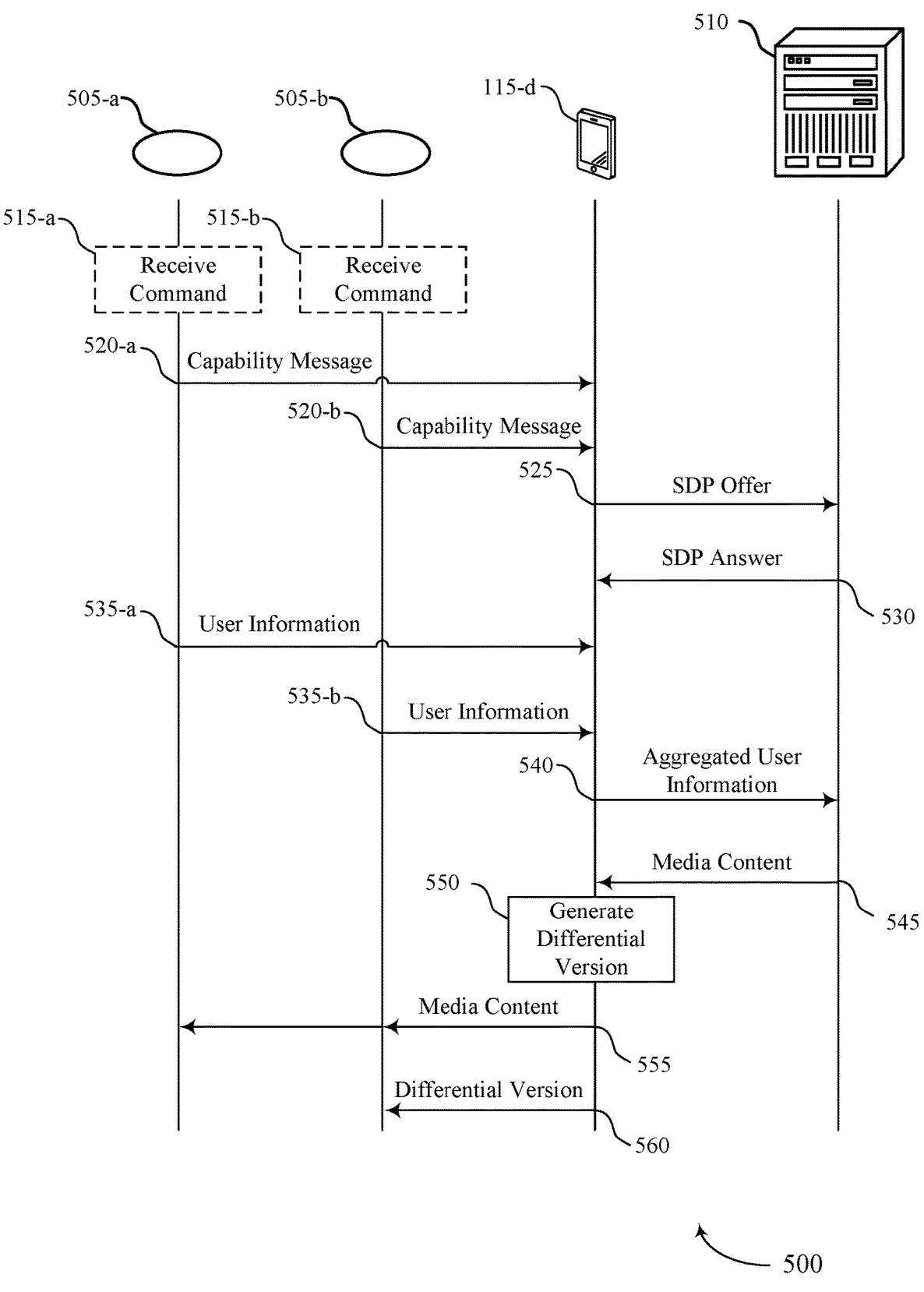
FIG. 5 shows an example of a process flow that supports media communications for wearable devices in accordance with one or more aspects of the present disclosure.

FIG. 5 shows an example of a process flow 500 that supports media communications for wearable devices in accordance with one or more aspects of the present disclosure. The process flow 500 may implement aspects of or may be implemented by aspects of the wireless communications system 100, the wireless communications system 200, the process flow 300, or the process flow 400. For example, the process flow 500 may include a UE 115-d, which may be an example of a UE 115 as described with reference to FIG. 1. The process flow 500 may include a wearable device 505-a and a wearable device 505-b, which may be examples of contact lenses (e.g., smart contact lenses) or other wearable devices as described with reference to FIG. 2. The process flow 500 may, additionally, or alternatively, include an end device 510, which may be an example of an application server as described with reference to FIG. 2.

In the following description of the process flow 500, the operations between the wearable device 505-a, the wearable device 505-b, the UE 115-d, and the end device 510 may be transmitted in a different order than the example order shown. Some operations may also be omitted from the process flow 500, and other operations may be added to the process flow 500. Further, although some operations or signaling may be shown to occur at different times for discussion purposes, these operations may actually occur at the same time.

In some examples, at 515-a and 515-b, the wearable device 505-a and the wearable device 505-b may receive a command from a user (e.g., a voice command, a hand gesture, or a selection from a menu in a virtual screen projected by the wearable device 505-a, the wearable device 505-b, the UE 115-d, or a combination thereof) to initiate first session flow and a second session flow (e.g., RTP sessions), respectively. In some examples, the command may indicate (e.g., explicitly) information including a destination address, such as a URL or IP address, of the end device 510, a name of an application (e.g., a game), a port number of each of the wearable device 505-a, the wearable device 505-b, and the end device 510, or a combination thereof. In some examples, the wearable device 505-a and the wearable device 505-b may derive the information based on an indication in the command.

At 520-a and 520-b, the wearable device 505-a and the wearable device 505-b may initiate the first session flow and the second session flow by transmitting, to the UE 115-d, a first capability message and a second capability message, respectively. The first capability message and the second capability message may indicate a media capability of the wearable device 505-a and the wearable device 505-b, respectively. For example, the first capability message may indicate a capability of the wearable device 505-a to receive a first stream of media content. The second capability message may indicate a capability of the wearable device 505-b to receive a second stream of media content.

At 525, the UE 115-d may transmit, to the end device 510, an SDP offer message to initiate a session (e.g., an RTP session) with the end device 510. The SDP offer message may indicate a presence of the wearable device 505-a and the wearable device 505-b. The UE 115-d may transmit the SDP offer message based on receiving the first capability message, the second capability message, or both. In some examples, the UE 115-d may initiate the first session flow and the second session flow (e.g., RTP sessions, Layer-3 links, or Layer-2 links) with the wearable device 505-a and the wearable device 505-b, respectively. The first session flow and the second session flow may each be associated with the session between the UE 115-d and the end device 510.

At 530, the UE 115-d may receive, from the end device 510, an SDP answer message. The end device 510 may transmit the SDP answer message in response to the SDP offer message.

At 535-a and 535-b, the wearable device 505-a and the wearable device 505-b may transmit, to the UE 115-d, an indication of a first set of information about the user and a second set of information about the user, respectively. The first set of information and the second set of information may include, for example, pose information, eye tracking information, or both. The wearable device 505-a may transmit the first set of information via the first session flow and the wearable device 505-b may transmit the second set of information via the second session flow.

At 540, the UE 115-d may transmit, to the end device 510, a set of aggregated information about the user. The set of aggregated information may include, for example, the first set of information and the second set of information.

At 545, the end device may transmit, to the UE 115-d, a stream of aggregated media content. In some examples, the stream of aggregated media content may include a baseline version of the media content and an additional version of the media content. The baseline version of the media content may be, for example, a first rendered video for display by the wearable device 505-a. The additional version of the media content may be, for example, a second rendered video for display by the wearable device 505-b in coordination with the first version of the media content.

At 550, the UE 115-d may generate a differential version of the media content. The differential version of the media content may be, for example, a differential value (e.g., a delta) between the first rendered video and the second rendered video. The differential version of the media content may be defined with respect to the baseline version. For example, the differential version of the media content may be defined such that a wireless device (e.g., the wearable device 505-a or the wearable device 505-b) may combine the differential version of the media content and the baseline version of the media content to generate the additional version of the media content.

At 555, the UE 115-d may transmit, to the wearable device 505-a and the wearable device 505-b, the baseline version of the media content via the first session flow and the second session flow, respectively. For example, the UE 115-*d* may transmit the baseline version of the media content to the wearable device 505-*a* and the wearable device 505-*b* via a broadcast message.

At 560, the UE 115-*d* may transmit, to the wearable device 505-*b*, the differential version of the media content via the second session flow. For example, the UE 115-*d* may transmit the differential version of the media content to the wearable device 505-*b* via a unicast message. The wearable device 505-*a* may project the first rendered video to the user in coordination with the wearable device 505-*b* projecting the second rendered video.

Figure 6:
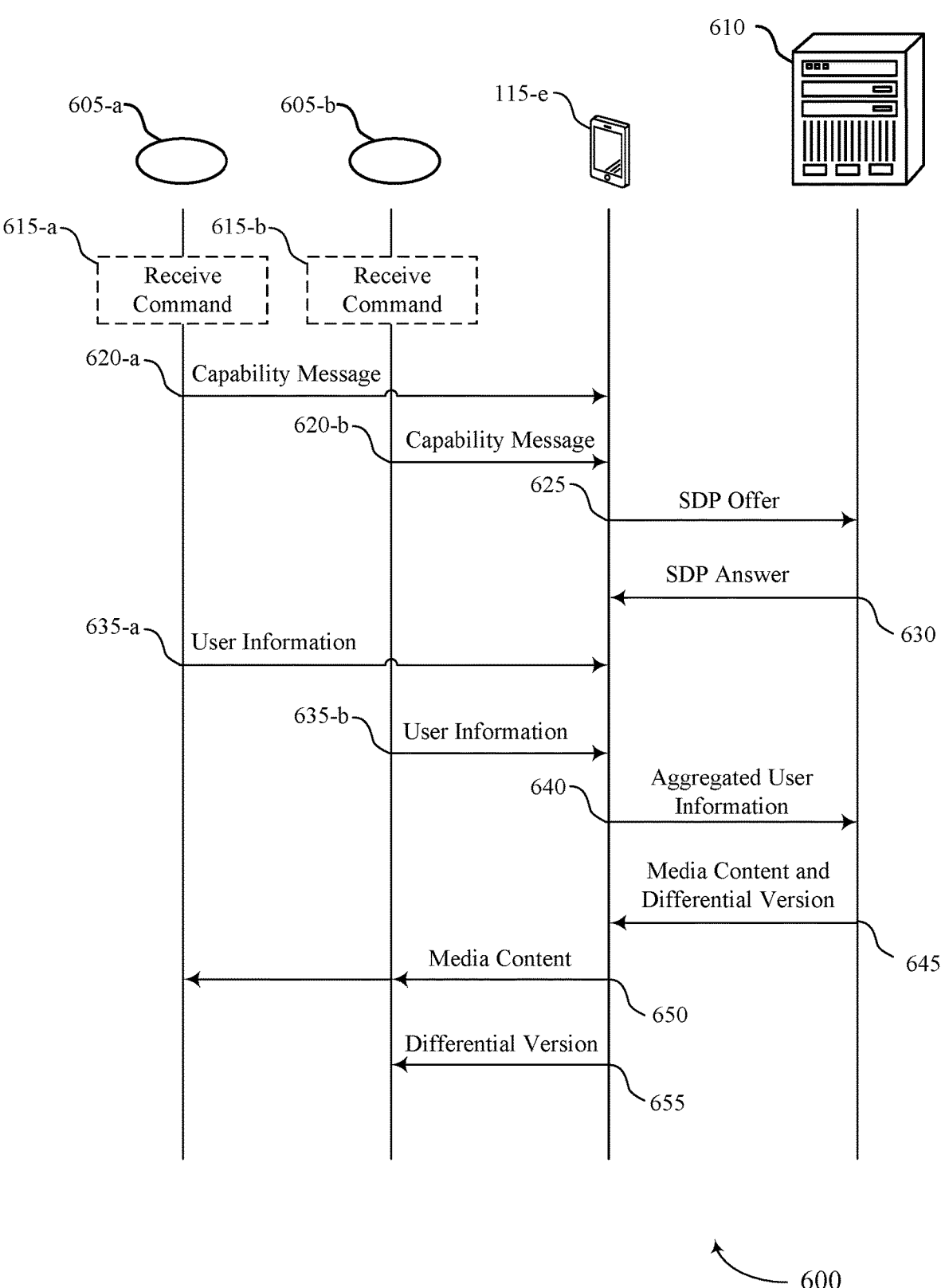
FIG. 6 shows an example of a process flow that supports media communications for wearable devices in accordance with one or more aspects of the present disclosure.

FIG. 6 shows an example of a process flow 600 that supports media communications for wearable devices in accordance with one or more aspects of the present disclosure. The process flow 600 may implement aspects of or may be implemented by aspects of the wireless communications system 100, the wireless communications system 200, the process flow 300, the process flow 400, or the process flow 500. For example, the process flow 600 may include a UE 115-*d*, which may be an example of a UE 115 as described with reference to FIG. 1. The process flow 600 may include a wearable device 605-*a* and a wearable device 605-*b*, which may be examples of contact lenses (e.g., smart contact lenses) or other wearable devices as described with reference to FIG. 2. The process flow 600 may, additionally, or alternatively, include a second end device 610, which may be an example of an application server as described with reference to FIG. 2.

In the following description of the process flow 600, the operations between the wearable device 605-*a*, the wearable device 605-*b*, the UE 115-*d*, and the end device 610 may be transmitted in a different order than the example order shown. Some operations may also be omitted from the process flow 600, and other operations may be added to the process flow 600. Further, although some operations or signaling may be shown to occur at different times for discussion purposes, these operations may actually occur at the same time.

In some examples, at 615-*a* and 615-*b*, respectively, the wearable device 605-*a* and the wearable device 605-*b* may receive a command from a user (e.g., a voice command, a hand gesture or a selection from a menu in a virtual screen projected by the wearable device 605-*a*, the wearable device 605-*b*, or the UE 115-*e*) to initiate first session flow and a second session flow (e.g., RTP sessions), respectively. In some examples, the command may indicate (e.g., explicitly) information including a destination address, such as a URL or IP address, of the end device 610, a name of an application (e.g., a game), a port number of each of the wearable device 605-*a*, the wearable device 605-*b*, and the end device 610, or a combination thereof. In some examples, the wearable device 605-*a* and the wearable device 605-*b* may derive the information based on an indication in the command.

At 620-*a* and 620-*b*, the wearable device 605-*a* and the wearable device 605-*b* may initiate the first session flow and the second session flow by transmitting, to the UE 115-*e*, a first capability message and a second capability message, respectively. The first capability message and the second capability message may indicate a media capability of the wearable device 605-*a* and the wearable device 605-*b*, respectively. For example, the first capability message may indicate a capability of the wearable device 605-*a* to receive a first stream of media content. The second capability message may indicate a capability of the wearable device 605-*b* to receive a second stream of media content.

At 625, the UE 115-*e* may transmit, to the end device 610, an SDP offer message to initiate a session (e.g., an RTP session) with the end device 610. The SDP offer message may indicate a presence of the wearable device 605-*a* and the wearable device 605-*b*. The UE 115-*e* may transmit the SDP offer message based on receiving the first capability message the second capability message, or both. In some examples, the UE 115-*e* may initiate the first session flow and the second session flow (e.g., RTP sessions, Layer-3 links, or Layer-2 links) with the wearable device 605-*a* and the wearable device 605-*b*, respectively. The first session flow and the second session flow may each be associated with the session between the UE 115-*e* and the end device 610.

At 630, the UE 115-*e* may receive, from the end device 610, an SDP answer message. The end device 610 may transmit the SDP answer message in response to the SDP offer message.

At 635-*a* and 635-*b*, the wearable device 605-*a* and the wearable device 605-*b* may transmit, to the UE 115-*e*, an indication of a first set of information about the user of the and a second set of information about the user, respectively. The first set of information and the second set of information may include, for example, pose information, eye tracking information, or both. The wearable device 605-*a* may transmit the first set of information via the first session flow and the wearable device 605-*b* may transmit the second set of information via the second session flow.

At 640, the UE 115-*e* may transmit, to the end device 610, a set of aggregated information about the user. The set of aggregated information may include, for example, the first set of information and the second set of information.

At 645, the end device may transmit, to the UE 115-*e*, a stream of aggregated media content. In some examples, the stream of aggregated media content may include a baseline version of the media content and a differential version of the media content. The first version of the media content may be, for example, a first rendered video for display by the wearable device 605-*a*. The differential version of the media content may be, for example, a differential value (e.g., a delta) between the first rendered video and an additional version of the media content (e.g., a second rendered video for display by the wearable device 605-*b*). The differential version of the media content may be defined with respect to the baseline version. For example, the differential version of the media content may be defined such that a wireless device (e.g., the wearable device 605-*a* or the wearable device 605-*b*) may combine the differential version of the media content and the baseline version of the media content to generate the additional version of the media content.

At 650, the UE 115-*e* may transmit, to the wearable device 605-*a* and the wearable device 605-*b*, the baseline version of the media content via the first session flow and the second session flow, respectively. For example, the UE 115-*e* may transmit the baseline version of the media content to the wearable device 605-*a* and the wearable device 605-*b* via a broadcast message.

At 655, the UE 115-*e* may transmit, to the wearable device 605-*b*, the differential version of the media content via the second session flow. For example, the UE 115-*e* may transmit the differential version of the media content to the wearable device 605-*b* via a unicast message. The wearable device 605-*a* may project the first rendered video to the user in coordination with the wearable device 605-*b* projecting the second rendered video.

Figure 7:
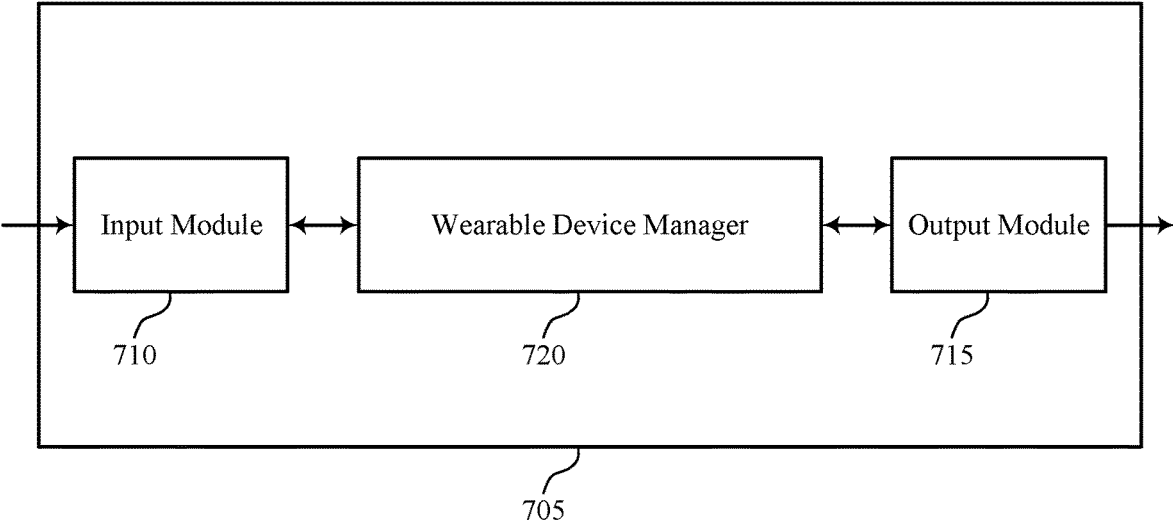
FIGS. 7 and 8 show block diagrams of devices that support media communications for wearable devices in accordance with one or more aspects of the present disclosure.

FIG. 7 shows a block diagram 700 of a device 705 that supports media communications for wearable devices in accordance with one or more aspects of the present disclosure. The device 705 may be an example of aspects of a wearable device as described herein. The device 705 may include an input module 710, an output module 715, and a wearable device manager 720. The device 705, or one or more components of the device 705 (e.g., the input module 710, the output module 715, and the wearable device manager 720), may include at least one processor, which may be coupled with at least one memory, to, individually or collectively, support or enable the described techniques. Each of these components may be in communication with one another (e.g., via one or more buses).

The wearable device manager 720, the input module 710, the output module 715, or various combinations thereof or various components thereof may be examples of means for performing various aspects of media communications for wearable devices as described herein. For example, the wearable device manager 720, the input module 710, the output module 715, or various combinations or components thereof may be capable of performing one or more of the functions described herein.

In some examples, the wearable device manager 720, the input module 710, the output module 715, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the wearable device manager 720, the input module 710, the output module 715, or various combinations or components thereof may be implemented in code (e.g., as communications management software or firmware) executed by at least one processor. If implemented in code executed by at least one processor, the functions of the wearable device manager 720, the input module 710, the output module 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

The wearable device manager 720 may support wireless communications at a first wearable device in accordance with examples as disclosed herein. For example, the wearable device manager 720 is capable of, configured to, or operable to support a means for initiating, via a wireless connection between the first wearable device and a UE, a first session flow, where the first session flow is associated with a second session flow for a second wearable device. The wearable device manager 720 is capable of, configured to, or operable to support a means for transmitting, via the first session flow, a set of information associated with a user of the first wearable device. The wearable device manager 720 is capable of, configured to, or operable to support a means for receiving a first stream of media content via the first session flow in coordination with a second stream of media content via the second session flow.

By including or configuring the wearable device manager 720 in accordance with examples as described herein, the device 705 (e.g., at least one processor controlling or otherwise coupled with the input module 710, the output module 715, the wearable device manager 720, or a combination thereof) may support techniques for a first wearable device and a second wearable device to initiate media sessions with a UE and an end device, which may result in reduced processing and reduced power consumption at the wearable devices, increased signaling throughput, and reduced latency.

Figure 8:

FIG. 8 shows a block diagram 800 of a device 805 that supports media communications for wearable devices in accordance with one or more aspects of the present disclosure. The device 805 may be an example of aspects of a device 705 or a wearable device as described herein. The device 805 may include an input module 810, an output module 815, and a wearable device manager 820. The device 805, or one or more components of the device 805 (e.g., the input module 810, the output module 815, and the wearable device manager 820), may include at least one processor, which may be coupled with at least one memory, to support the described techniques. Each of these components may be in communication with one another (e.g., via one or more buses).

The device 805, or various components thereof, may be an example of means for performing various aspects of media communications for wearable devices as described herein. For example, the wearable device manager 820 may include a session flow initiation manager 825, a user information manager 830, a media content manager 835, or any combination thereof. The wearable device manager 820 may be an example of aspects of a wearable device manager 720 as described herein. In some examples, the wearable device manager 820, or various components thereof, may be configured to perform various operations (e.g., receiving, obtaining, monitoring, outputting, transmitting) using or otherwise in cooperation with the input module 810, the output module 815, or both. For example, the wearable device manager 820 may receive information from the input module 810, send information to the output module 815, or be integrated in combination with the input module 810, the output module 815, or both to obtain information, output information, or perform various other operations as described herein.

The wearable device manager 820 may support wireless communications at a first wearable device in accordance with examples as disclosed herein. The session flow initiation manager 825 is capable of, configured to, or operable to support a means for initiating, via a wireless connection between the first wearable device and a UE, a first session flow, where the first session flow is associated with a second session flow for a second wearable device. The user information manager 830 is capable of, configured to, or operable to support a means for transmitting, via the first session flow, a set of information associated with a user of the first wearable device. The media content manager 835 is capable of, configured to, or operable to support a means for receiving a first stream of media content via the first session flow in coordination with a second stream of media content via the second session flow.

Figure 9:
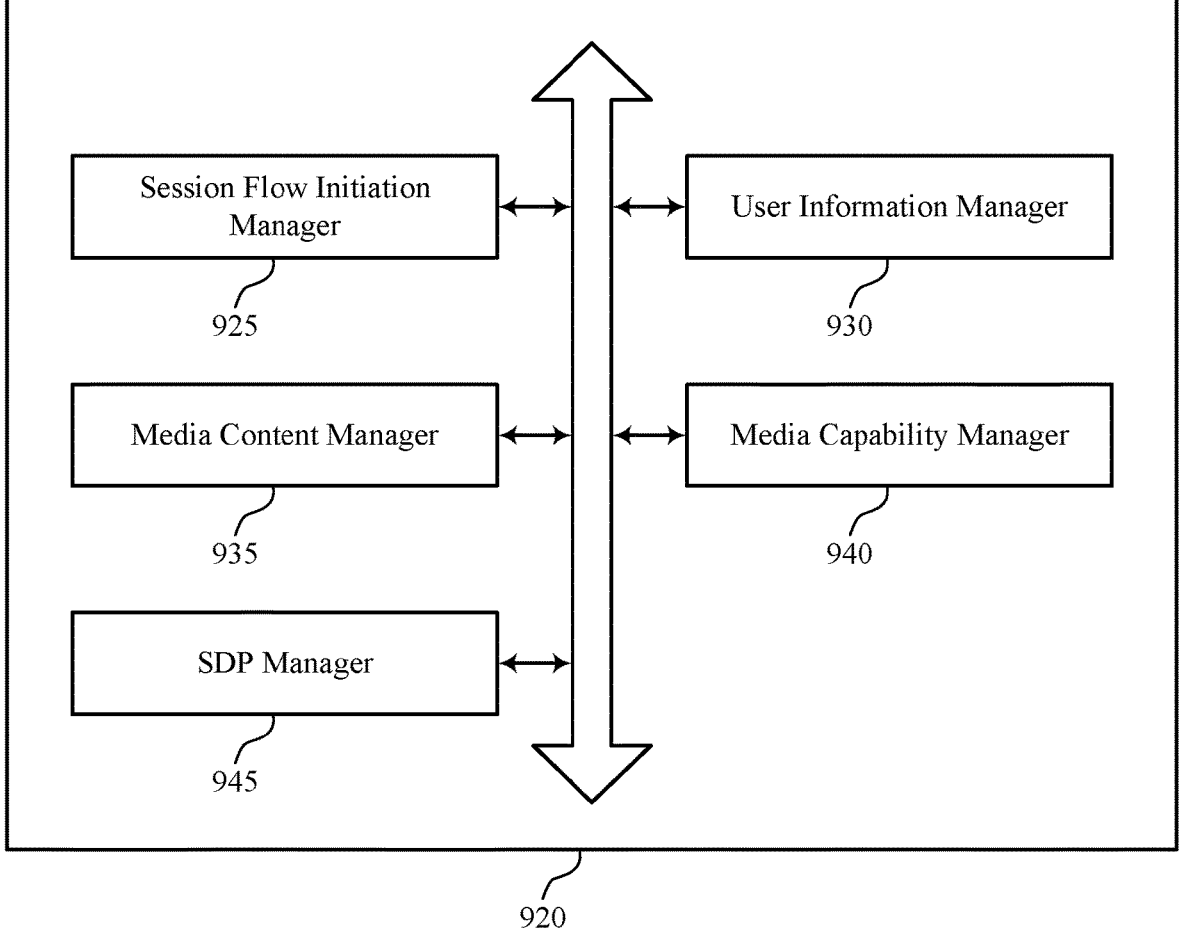
FIG. 9 shows a block diagram of a wearable device manager that supports media communications for wearable devices in accordance with one or more aspects of the present disclosure.

FIG. 9 shows a block diagram 900 of a wearable device manager 920 that supports media communications for wearable devices in accordance with one or more aspects of the present disclosure. The wearable device manager 920 may be an example of aspects of a wearable device manager 720, a wearable device manager 820, or both, as described herein.

The wearable device manager 920, or various components thereof, may be an example of means for performing various aspects of media communications for wearable devices as described herein. For example, the wearable device manager 920 may include a session flow initiation manager 925, a user information manager 930, a media content manager 935, a media capability manager 940, an SDP manager 945, or any combination thereof. Each of these components, or components or subcomponents thereof (e.g., one or more processors, one or more memories), may communicate, directly or indirectly, with one another (e.g., via one or more buses).

The wearable device manager 920 may support wireless communications at a first wearable device in accordance with examples as disclosed herein. The session flow initiation manager 925 is capable of, configured to, or operable to support a means for initiating, via a wireless connection between the first wearable device and a UE, a first session flow, where the first session flow is associated with a second session flow for a second wearable device. The user information manager 930 is capable of, configured to, or operable to support a means for transmitting, via the first session flow, a set of information associated with a user of the first wearable device. The media content manager 935 is capable of, configured to, or operable to support a means for receiving a first stream of media content via the first session flow in coordination with a second stream of media content via the second session flow.

In some examples, to support receiving the first stream of media content, the media content manager 935 is capable of, configured to, or operable to support a means for receiving, via the first session flow, a first version of the media content via the first stream of media content, where the first version includes one of a baseline version or a differential version that is defined with respect to the baseline version.

In some examples, the second stream of media content is associated with a second version of the media content, the second version including the other of the baseline version or the differential version.

In some examples, the baseline version is groupcast to the first wearable device and the second wearable device and the differential version is unicast to one of the first wearable device or the second wearable device.

In some examples, to support receiving the first stream of media content, the media content manager 935 is capable of, configured to, or operable to support a means for receiving, from the UE, the baseline version via a first unicast message, where a second version is transmitted to the second wearable device via a second unicast message.

In some examples, the first session flow and the second session flow are associated with a same session between the UE and an end device. In some examples, the first session flow is associated with a first session with an end device. In some examples, the first session is different from a second session with the end device associated with the second session flow.

In some examples, to support initiating the first session flow, the media capability manager 940 is capable of, configured to, or operable to support a means for transmitting, to the UE, a capability message indicating a capability of the first wearable device to receive the first stream of media content. In some examples, to support initiating the first session flow, the SDP manager 945 is capable of, configured to, or operable to support a means for transmitting, to an end device, an SDP offer message and receiving, from the end device, an SDP answer message based on the SDP offer message.

In some examples, the set of information associated with the user includes one or more of pose information and eye tracking information. In some examples, the first wearable device and the second wearable device are contact lenses. In some examples, the media content includes rendered video for display by the first wearable device in coordination with the second wearable device.

Figure 10:
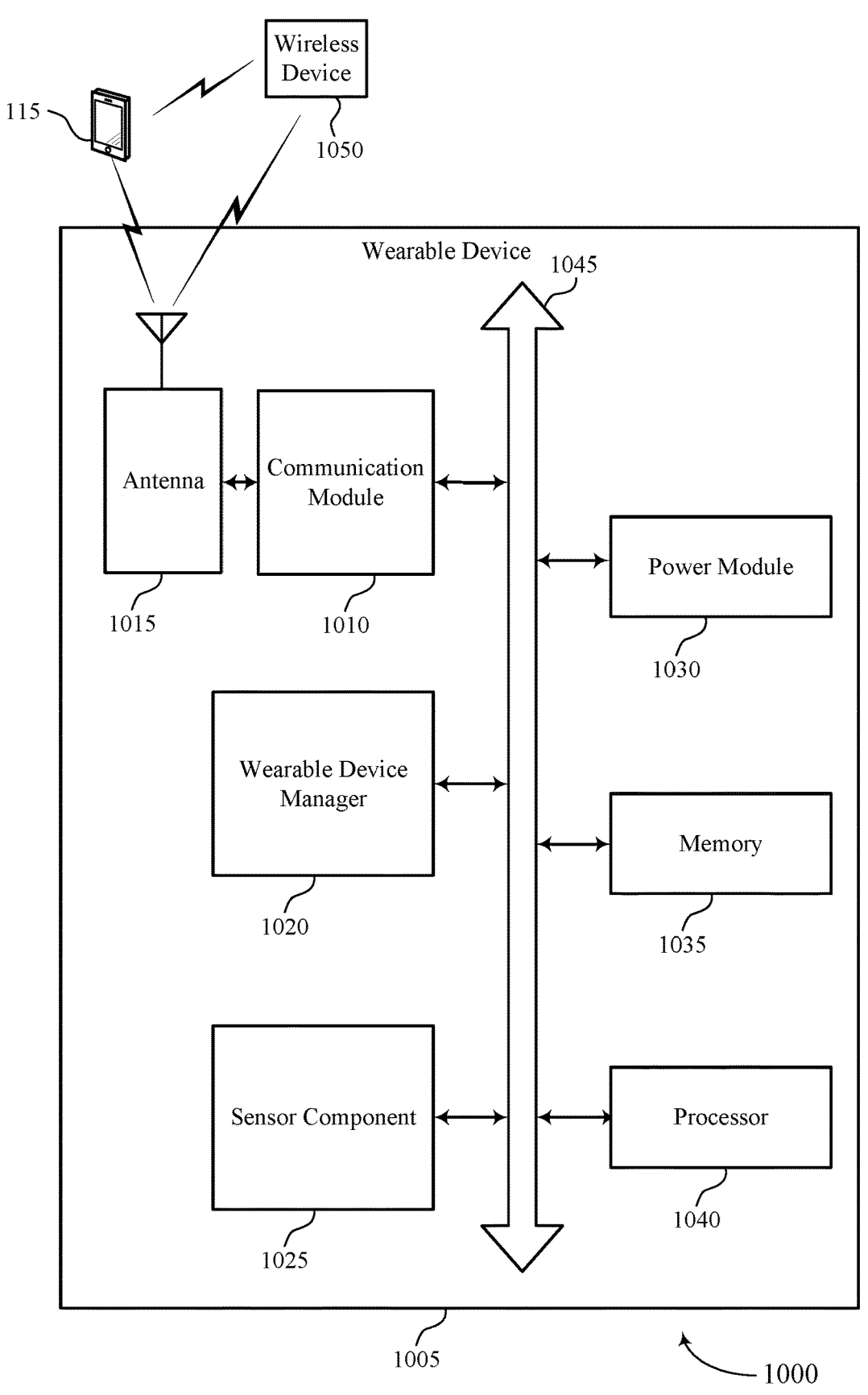
FIG. 10 shows a diagram of a system including a device that supports media communications for wearable devices in accordance with one or more aspects of the present disclosure.

FIG. 10 shows a diagram of a system 1000 including a device 1005 that supports media communications for wearable devices in accordance with one or more aspects of the present disclosure. The device 1005 may be an example of or include the components of a device 705, a device 805, or a wearable device as described herein. The device 1005 may include components for bi-directional voice and data communications including components for transmitting and receiving communications, such as a wearable device manager 1020, a communication module 1010, an antenna 1015, a sensor component 1025, a power module 1030, at least one memory 1035, at least one processor 1040, and a wireless device 1050. These components may be in electronic communication or otherwise coupled (e.g., operatively, communicatively, functionally, electronically, electrically) via one or more buses (e.g., a bus 1045).

The wearable device manager 1020 may support wireless communications at a first wearable device in accordance with examples as disclosed herein. For example, the wearable device manager 1020 is capable of, configured to, or operable to support a means for initiating, via a wireless connection between the first wearable device and a UE, a first session flow, where the first session flow is associated with a second session flow for a second wearable device. The wearable device manager 1020 is capable of, configured to, or operable to support a means for transmitting, via the first session flow, a set of information associated with a user of the first wearable device. The wearable device manager 1020 is capable of, configured to, or operable to support a means for receiving a first stream of media content via the first session flow in coordination with a second stream of media content via the second session flow.

By including or configuring the wearable device manager 1020 in accordance with examples as described herein, the device 1005 may support techniques for a first wearable device and a second wearable device to initiate media sessions with a UE and an end device, which may result in improved communication reliability, improved user experience related to reduced processing, reduced power consumption, and improved coordination between devices.

FIG. 11 shows a block diagram 1100 of a device 1105 that supports media communications for wearable devices in accordance with one or more aspects of the present disclosure. The device 1105 may be an example of aspects of a UE 115 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to, individually or collectively, support or enable the described techniques. Each of these components may be in communication with one another (e.g., via one or more buses).

The receiver 1110 may provide a means for receiving information such as packets, user data, control information, or any combination thereof associated with various information channels (e.g., control channels, data channels, information channels related to media communications for wearable devices). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to media communications for wearable devices). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of media communications for wearable devices as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a UE in accordance with examples as disclosed herein. For example, the communications manager 1120 is capable of, configured to, or operable to support a means for initiating, via a wireless connection between the UE and a first wearable device, a first session flow for the first wearable device, where the first session flow is associated with a second session flow for a second wearable device. The communications manager 1120 is capable of, configured to, or operable to support a means for receiving, via the first session flow, a set of information associated with a user of the first wearable device. The communications manager 1120 is capable of, configured to, or operable to support a means for receiving, via the second session flow, a set of information associated with a user of the second wearable device. The communications manager 1120 is capable of, configured to, or operable to support a means for transmitting a first stream of media content to the first wearable device via the first session flow. The communications manager 1120 is capable of, configured to, or operable to support a means for transmitting a second stream of media content to the second wearable device via the second session flow in coordination with the first stream of media content.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for a first wearable device and a second wearable device to initiate media sessions with a UE and an end device, which may result in reduced processing, reduced power consumption, increased signaling throughput, and reduced latency.

Figure 12:
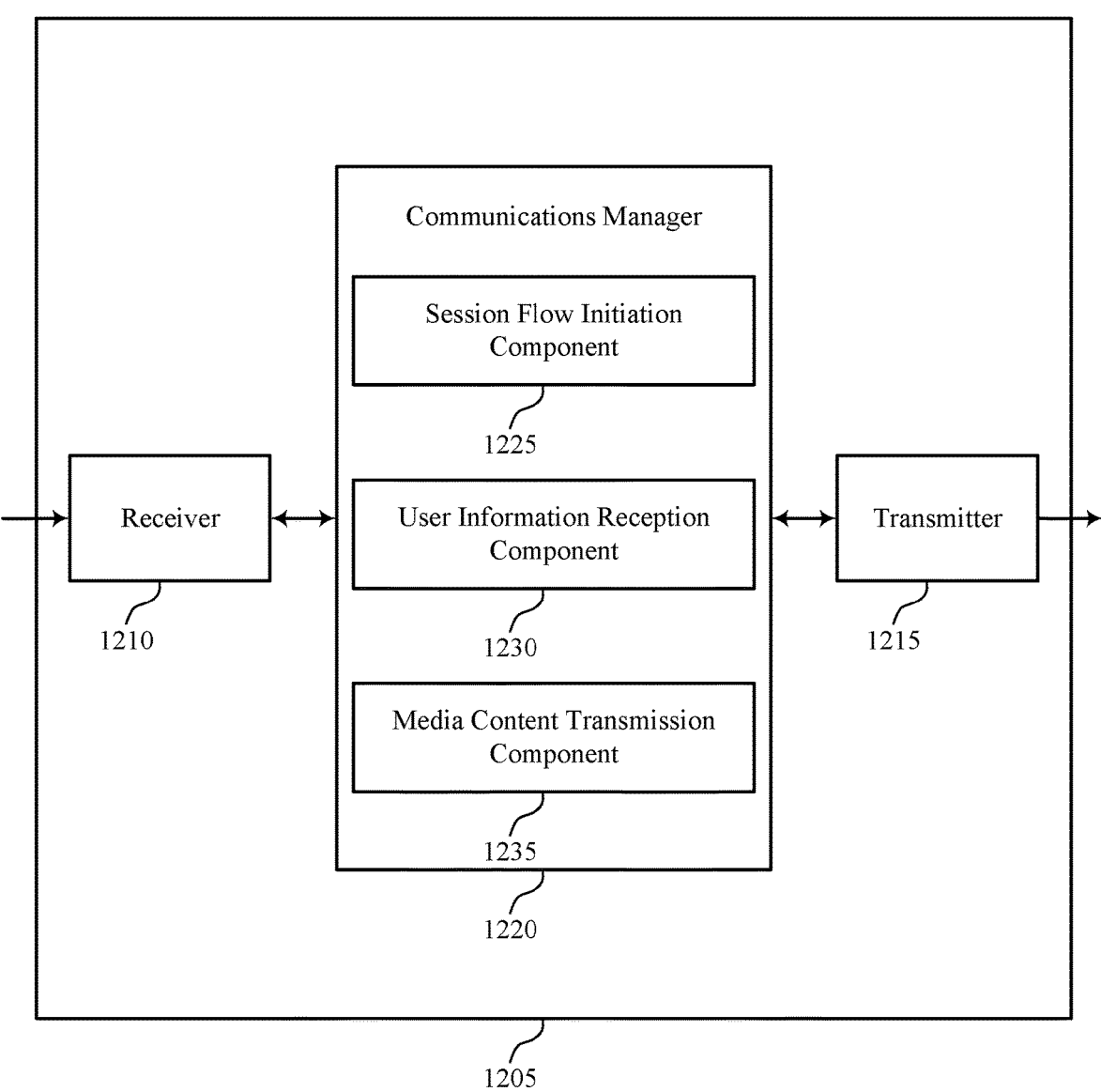

FIG. 12 shows a block diagram 1200 of a device 1205 that supports media communications for wearable devices in accordance with one or more aspects of the present disclosure. The device 1205 may be an example of aspects of a device 1105 or a UE 115 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to support the described techniques. Each of these components may be in communication with one another (e.g., via one or more buses).

The receiver 1210 may provide a means for receiving information such as packets, user data, control information, or any combination thereof associated with various information channels (e.g., control channels, data channels, information channels related to media communications for wearable devices). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to media communications for wearable devices). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of media communications for wearable devices as described herein. For example, the communications manager 1220 may include a session flow initiation component 1225, a user information reception component 1230, a media content transmission component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a UE in accordance with examples as disclosed herein. The session flow initiation component 1225 is capable of, configured to, or operable to support a means for initiating, via a wireless connection between the UE and a first wearable device, a first session flow for the first wearable device, where the first session flow is associated with a second session flow for a second wearable device. The user information reception component 1230 is capable of, configured to, or operable to support a means for receiving, via the first session flow, a set of information associated with a user of the first wearable device. The user information reception component 1230 is capable of, configured to, or operable to support a means for receiving, via the second session flow, a set of information associated with a user of the second wearable device. The media content transmission component 1235 is capable of, configured to, or operable to support a means for transmitting a first stream of media content to the first wearable device via the first session flow. The media content transmission component 1235 is capable of, configured to, or operable to support a means for transmitting a second stream of media content to the second wearable device via the second session flow in coordination with the first stream of media content.

Figure 13:
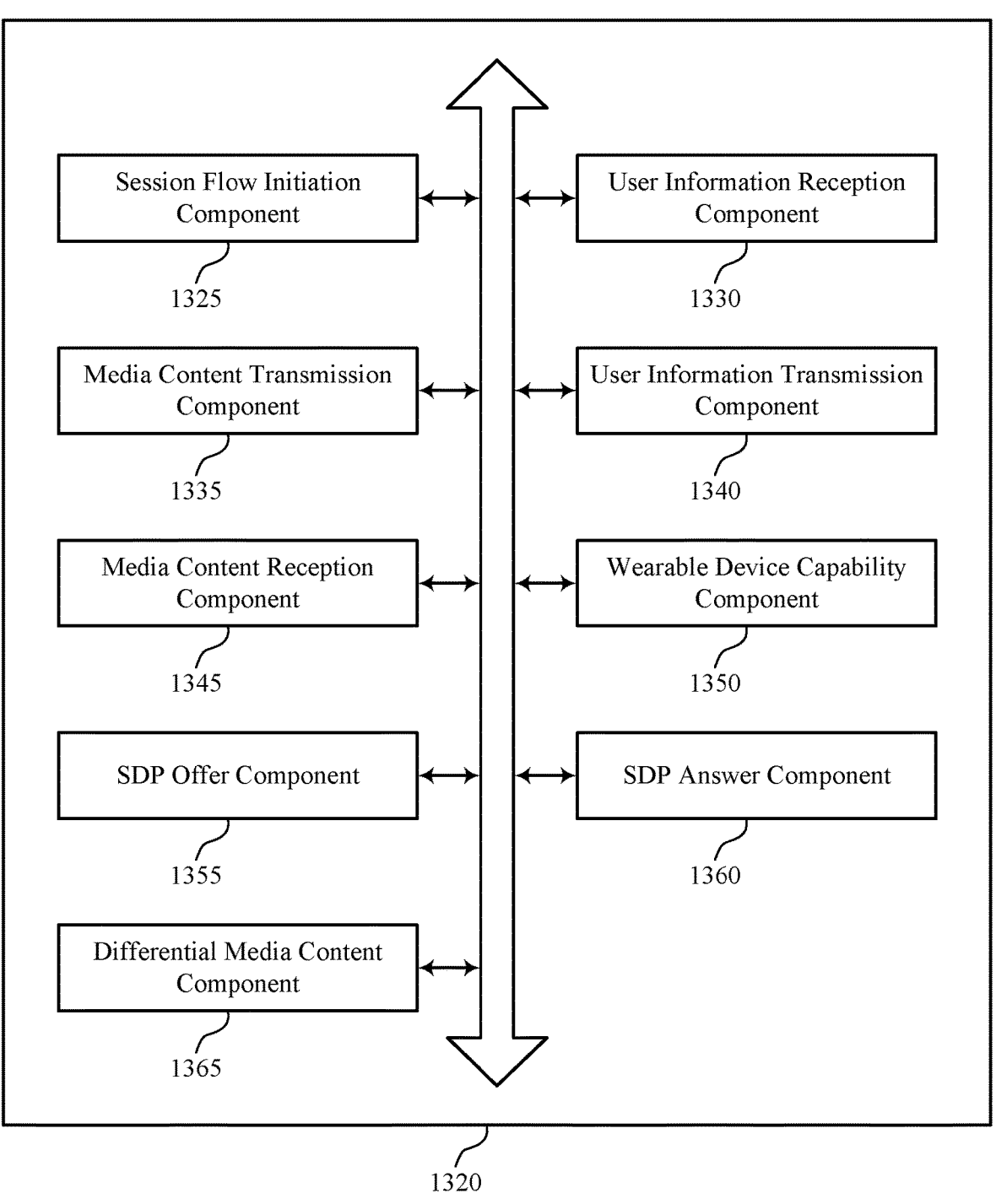
FIG. 13 shows a block diagram of a communications manager that supports media communications for wearable devices in accordance with one or more aspects of the present disclosure.

FIG. 13 shows a block diagram 1300 of a communications manager 1320 that supports media communications for wearable devices in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of media communications for wearable devices as described herein. For example, the communications manager 1320 may include a session flow initiation component 1325, a user information reception component 1330, a media content transmission component 1335, a user information transmission component 1340, a media content reception component 1345, a wearable device capability component 1350, an SDP offer component 1355, an SDP answer component 1360, a differential media content component 1365, or any combination thereof. Each of these components, or components or subcomponents thereof (e.g., one or more processors, one or more memories), may communicate, directly or indirectly, with one another (e.g., via one or more buses).

The communications manager 1320 may support wireless communications at a UE in accordance with examples as disclosed herein. The session flow initiation component 1325 is capable of, configured to, or operable to support a means for initiating, via a wireless connection between the UE and a first wearable device, a first session flow for the first wearable device, where the first session flow is associated with a second session flow for a second wearable device. The user information reception component 1330 is capable of, configured to, or operable to support a means for receiving, via the first session flow, a set of information associated with a user of the first wearable device. In some examples, the user information reception component 1330 is capable of, configured to, or operable to support a means for receiving, via the second session flow, a set of information associated with a user of the second wearable device. The media content transmission component 1335 is capable of, configured to, or operable to support a means for transmitting a first stream of media content to the first wearable device via the first session flow. In some examples, the media content transmission component 1335 is capable of, configured to, or operable to support a means for transmitting a second stream of media content to the second wearable device via the second session flow in coordination with the first stream of media content.

In some examples, the user information transmission component 1340 is capable of, configured to, or operable to support a means for transmitting, to an end device, a set of aggregated information that includes the set of information associated with the user of the first wearable device and a second set of information associated with the user of the second wearable device. In some examples, the media content reception component 1345 is capable of, configured to, or operable to support a means for receiving, from the end device, aggregated media content associated with the first stream of media content and the second stream of media content.

In some examples, to support transmitting the first stream of media content, the media content transmission component 1335 is capable of, configured to, or operable to support a means for transmitting, via the first stream, a first version of the media content via the first stream of media content, where the first version includes one of a baseline version or a differential version that is defined with respect to the baseline version.

In some examples, the second stream of media content is associated with a second version of the media content, the second version including the other of the baseline version or the differential version.

In some examples, the baseline version is groupcast to the first wearable device and the second wearable device and the differential version is unicast to one of the first wearable device or the second wearable device.

In some examples, the media content reception component 1345 is capable of, configured to, or operable to support a means for receiving, from the end device, an indication of the baseline version and the differential version.

In some examples, the media content reception component 1345 is capable of, configured to, or operable to support a means for receiving, from the end device, an indication of the baseline version and a second version of the media content. In some examples, the differential media content component 1365 is capable of, configured to, or operable to support a means for generating the differential version based on receiving the indication.

In some examples, to support transmitting the first stream of media content, the media content transmission component 1335 is capable of, configured to, or operable to support a means for transmitting the baseline version to the first wearable device via a first unicast message. In some examples, to support transmitting the first stream of media content, the media content transmission component 1335 is capable of, configured to, or operable to support a means for transmitting a second version of the media content to the second wearable device via a second unicast message.

In some examples, to support initiating the first session flow, the wearable device capability component 1350 is capable of, configured to, or operable to support a means for receiving, from the first wearable device, a first capability message indicating a capability of the first wearable device to receive the first stream of media content. In some examples, to support initiating the first session flow, the wearable device capability component 1350 is capable of, configured to, or operable to support a means for receiving, from the second wearable device, a second capability message indicating a capability of the second wearable device to receive the second stream of media content. In some examples, to support initiating the first session flow, the SDP offer component 1355 is capable of, configured to, or operable to support a means for transmitting, to an end device, an SDP offer message based on the first capability message and the second capability message. In some examples, to support initiating the first session flow, the SDP answer component 1360 is capable of, configured to, or operable to support a means for receiving, from the end device, an SDP answer message based on the SDP offer message.

In some examples, the first session flow and the second session flow are associated with a same session between the UE and an end device. In some examples, the set of information associated with the user includes one or more of pose information and eye tracking information. In some examples, the first wearable device and the second wearable device are contact lenses. In some examples, the media content includes rendered video for display by the first wearable device in coordination with the second wearable device.

Figure 14:
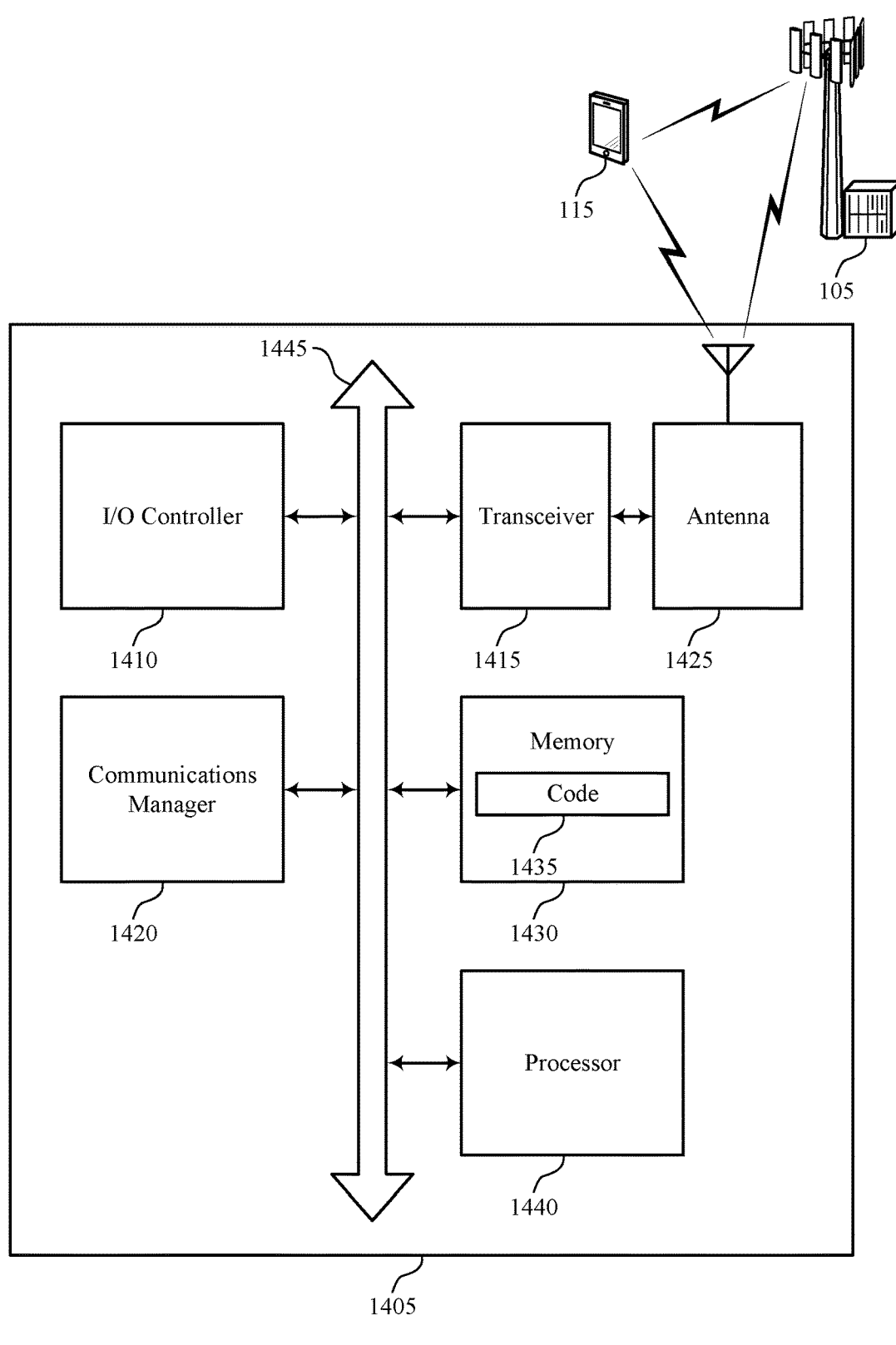
FIG. 14 shows a diagram of a system including a device that supports media communications for wearable devices in accordance with one or more aspects of the present disclosure.

FIG. 14 shows a diagram of a system 1400 including a device 1405 that supports media communications for wearable devices in accordance with one or more aspects of the present disclosure. The device 1405 may be an example of or include the components of a device 1105, a device 1205, or a UE 115 as described herein. The device 1405 may communicate (e.g., wirelessly) with one or more network entities 105, one or more UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, at least one memory 1430, code 1435, and at least one processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally, or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting media communications for wearable devices). For example, the device 1405 or a component of the device 1405 may include a processor 1440 and memory 1430 coupled with or to the processor 1440, the processor 1440 and memory 1430 configured to perform various functions described herein.

The communications manager 1420 may support wireless communications at a UE in accordance with examples as disclosed herein. For example, the communications manager 1420 is capable of, configured to, or operable to support a means for initiating, via a wireless connection between the UE and a first wearable device, a first session flow for the first wearable device, where the first session flow is associated with a second session flow for a second wearable device. The communications manager 1420 is capable of, configured to, or operable to support a means for receiving, via the first session flow, a set of information associated with a user of the first wearable device. The communications manager 1420 is capable of, configured to, or operable to support a means for receiving, via the second session flow, a set of information associated with a user of the second wearable device. The communications manager 1420 is capable of, configured to, or operable to support a means for transmitting a first stream of media content to the first wearable device via the first session flow. The communications manager 1420 is capable of, configured to, or operable to support a means for transmitting a second stream of media content to the second wearable device via the second session flow in coordination with the first stream of media content.

By including or configuring the communications manager 1420 in accordance with examples as described herein, the device 1405 may support techniques for a first wearable device and a second wearable device to initiate media sessions with a UE and an end device, which may result in improved communication reliability, reduced latency, improved user experience related to reduced processing, reduced power consumption, and improved coordination between devices.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of media communications for wearable devices as described herein, or the processor 1440 and the memory 1430 may be otherwise configured to perform or support such operations.

FIG. 15 shows a flowchart illustrating a method 1500 that supports media communications for wearable devices in accordance with aspects of the present disclosure. The operations of the method 1500 may be implemented by a wearable device or its components as described herein. For example, the operations of the method 1500 may be performed by a wearable device as described with reference to FIGS. 1 through 10. In some examples, a wearable device may execute a set of instructions to control the functional elements of the wearable device to perform the described functions. Additionally, or alternatively, the wearable device may perform aspects of the described functions using special-purpose hardware.

At 1505, the method may include initiating, via a wireless connection between the first wearable device and a UE, a first session flow, where the first session flow is associated with a second session flow for a second wearable device. The operations of block 1505 may be performed in accordance with examples as disclosed herein. In some examples, aspects of the operations of 1505 may be performed by a session flow initiation manager 925 as described with reference to FIG. 9.

At 1510, the method may include transmitting, via the first session flow, a set of information associated with a user of the first wearable device. The operations of block 1510 may be performed in accordance with examples as disclosed herein. In some examples, aspects of the operations of 1510 may be performed by a user information manager 930 as described with reference to FIG. 9.

At 1515, the method may include receiving a first stream of media content via the first session flow in coordination with a second stream of media content via the second session flow. The operations of block 1515 may be performed in accordance with examples as disclosed herein. In some examples, aspects of the operations of 1515 may be performed by a media content manager 935 as described with reference to FIG. 9.

FIG. 16 shows a flowchart illustrating a method 1600 that supports media communications for wearable devices in accordance with aspects of the present disclosure. The operations of the method 1600 may be implemented by a wearable device or its components as described herein. For example, the operations of the method 1600 may be performed by a wearable device as described with reference to FIGS. 1 through 10. In some examples, a wearable device may execute a set of instructions to control the functional elements of the wearable device to perform the described functions. Additionally, or alternatively, the wearable device may perform aspects of the described functions using special-purpose hardware.

At 1605, the method may include initiating, via a wireless connection between the first wearable device and a UE, a first session flow, where the first session flow is associated with a second session flow for a second wearable device. The operations of block 1605 may be performed in accordance with examples as disclosed herein. In some examples, aspects of the operations of 1605 may be performed by a session flow initiation manager 925 as described with reference to FIG. 9.

At 1610, the method may include transmitting, via the first session flow, a set of information associated with a user of the first wearable device. The operations of block 1610 may be performed in accordance with examples as disclosed herein. In some examples, aspects of the operations of 1610 may be performed by a user information manager 930 as described with reference to FIG. 9.

At 1615, the method may include receiving a first stream of media content via the first session flow in coordination with a second stream of media content via the second session flow. The operations of block 1615 may be performed in accordance with examples as disclosed herein. In some examples, aspects of the operations of 1615 may be performed by a media content manager 935 as described with reference to FIG. 9.

At 1620, the method may include receiving, via the first session flow, a first version of the media content via the first stream of media content, where the first version includes one of a baseline version or a differential version that is defined with respect to the baseline version. The operations of block 1620 may be performed in accordance with examples as disclosed herein. In some examples, aspects of the operations of 1620 may be performed by a media content manager 935 as described with reference to FIG. 9.

FIG. 17 shows a flowchart illustrating a method 1700 that supports media communications for wearable devices in accordance with aspects of the present disclosure. The operations of the method 1700 may be implemented by a wearable device or its components as described herein. For example, the operations of the method 1700 may be performed by a wearable device as described with reference to FIGS. 1 through 10. In some examples, a wearable device may execute a set of instructions to control the functional elements of the wearable device to perform the described functions. Additionally, or alternatively, the wearable device may perform aspects of the described functions using special-purpose hardware.

At 1705, the method may include initiating, via a wireless connection between the first wearable device and a UE, a first session flow, where the first session flow is associated with a second session flow for a second wearable device.

The operations of block 1705 may be performed in accordance with examples as disclosed herein. In some examples, aspects of the operations of 1705 may be performed by a session flow initiation manager 925 as described with reference to FIG. 9.

At 1710, the method may include transmitting, via the first session flow, a set of information associated with a user of the first wearable device. The operations of block 1710 may be performed in accordance with examples as disclosed herein. In some examples, aspects of the operations of 1710 may be performed by a user information manager 930 as described with reference to FIG. 9.

At 1715, the method may include receiving a first stream of media content via the first session flow in coordination with a second stream of media content via the second session flow. The operations of block 1715 may be performed in accordance with examples as disclosed herein. In some examples, aspects of the operations of 1715 may be performed by a media content manager 935 as described with reference to FIG. 9.

At 1720, the method may include receiving, via the first session flow, a first version of the media content via the first stream of media content, where the first version includes one of a baseline version or a differential version that is defined with respect to the baseline version. The operations of block 1720 may be performed in accordance with examples as disclosed herein. In some examples, aspects of the operations of 1720 may be performed by a media content manager 935 as described with reference to FIG. 9.

At 1725, the method may include receiving, from the UE, the baseline version via a first unicast message, where a second version is transmitted to the second wearable device via a second unicast message. The operations of block 1725 may be performed in accordance with examples as disclosed herein. In some examples, aspects of the operations of 1725 may be performed by a media content manager 935 as described with reference to FIG. 9.

FIG. 18 shows a flowchart illustrating a method 1800 that supports media communications for wearable devices in accordance with aspects of the present disclosure. The operations of the method 1800 may be implemented by a UE or its components as described herein. For example, the operations of the method 1800 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1805, the method may include initiating, via a wireless connection between the UE and a first wearable device, a first session flow for the first wearable device, where the first session flow is associated with a second session flow for a second wearable device. The operations of block 1805 may be performed in accordance with examples as disclosed herein. In some examples, aspects of the operations of 1805 may be performed by a session flow initiation component 1325 as described with reference to FIG. 13.

At 1810, the method may include receiving, via the first session flow, a set of information associated with a user of the first wearable device. The operations of block 1810 may be performed in accordance with examples as disclosed herein. In some examples, aspects of the operations of 1810 may be performed by a user information reception component 1330 as described with reference to FIG. 13.

At 1815, the method may include receiving, via the second session flow, a set of information associated with a user of the second wearable device. The operations of block 1815 may be performed in accordance with examples as disclosed herein. In some examples, aspects of the operations of 1815 may be performed by a user information reception component 1330 as described with reference to FIG. 13.

At 1820, the method may include transmitting a first stream of media content to the first wearable device via the first session flow. The operations of block 1820 may be performed in accordance with examples as disclosed herein. In some examples, aspects of the operations of 1820 may be performed by a media content transmission component 1335 as described with reference to FIG. 13.

At 1825, the method may include transmitting a second stream of media content to the second wearable device via the second session flow in coordination with the first stream of media content. The operations of block 1825 may be performed in accordance with examples as disclosed herein. In some examples, aspects of the operations of 1825 may be performed by a media content transmission component 1335 as described with reference to FIG. 13.

Figure 19:
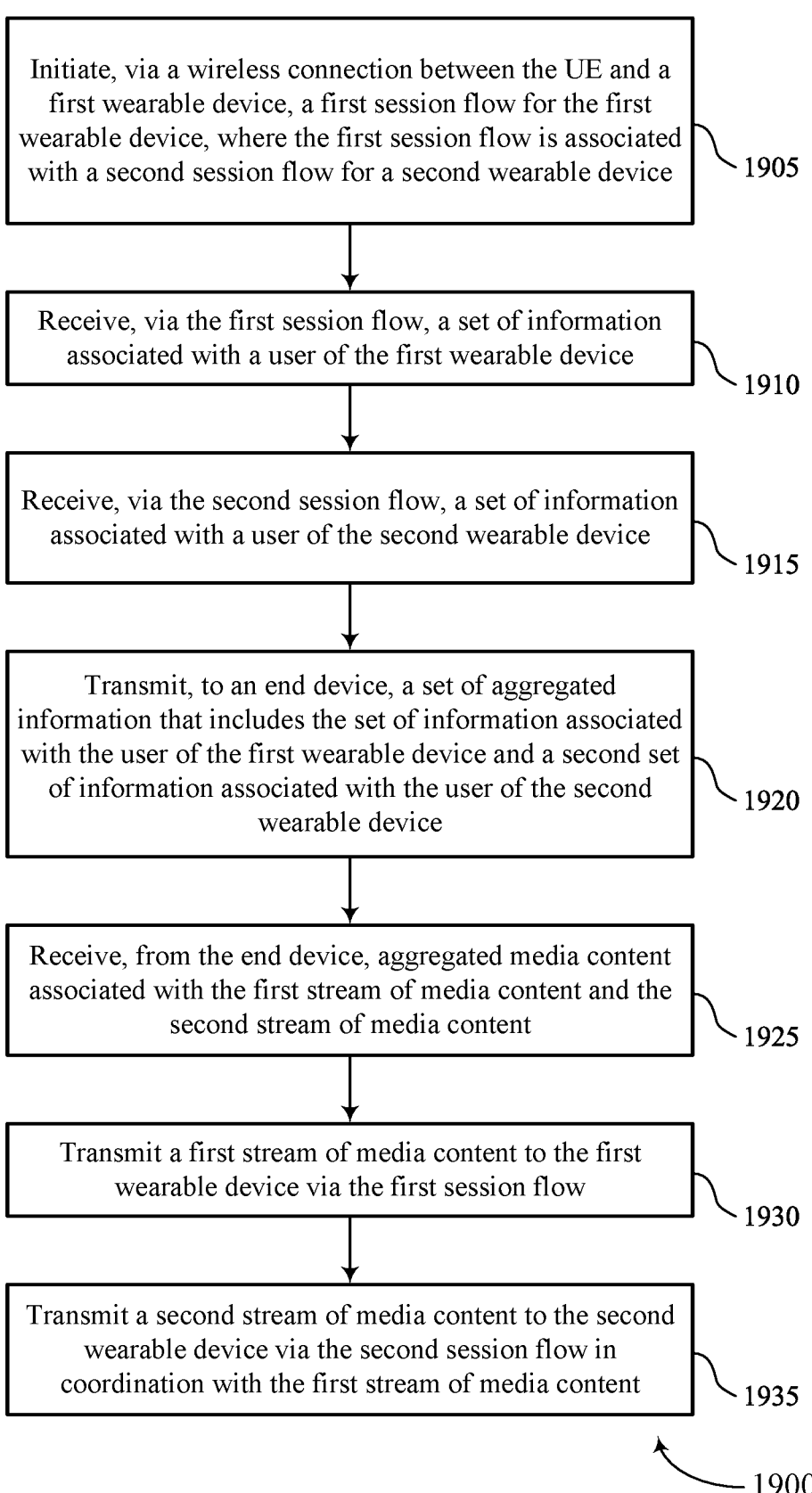

FIG. 19 shows a flowchart illustrating a method 1900 that supports media communications for wearable devices in accordance with aspects of the present disclosure. The operations of the method 1900 may be implemented by a UE or its components as described herein. For example, the operations of the method 1900 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1905, the method may include initiating, via a wireless connection between the UE and a first wearable device, a first session flow for the first wearable device, where the first session flow is associated with a second session flow for a second wearable device. The operations of block 1905 may be performed in accordance with examples as disclosed herein. In some examples, aspects of the operations of 1905 may be performed by a session flow initiation component 1325 as described with reference to FIG. 13.

At 1910, the method may include receiving, via the first session flow, a set of information associated with a user of the first wearable device. The operations of block 1910 may be performed in accordance with examples as disclosed herein. In some examples, aspects of the operations of 1910 may be performed by a user information reception component 1330 as described with reference to FIG. 13.

At 1915, the method may include receiving, via the second session flow, a set of information associated with a user of the second wearable device. The operations of block 1915 may be performed in accordance with examples as disclosed herein. In some examples, aspects of the operations of 1915 may be performed by a user information reception component 1330 as described with reference to FIG. 13.

At 1920, the method may include transmitting, to an end device, a set of aggregated information that includes the set of information associated with the user of the first wearable device and a second set of information associated with the user of the second wearable device. The operations of block 1920 may be performed in accordance with examples as disclosed herein. In some examples, aspects of the operations of 1920 may be performed by a user information transmission component 1340 as described with reference to FIG. 13.

At 1925, the method may include receiving, from the end device, aggregated media content associated with the first stream of media content and the second stream of media content. The operations of block 1925 may be performed in accordance with examples as disclosed herein. In some examples, aspects of the operations of 1925 may be performed by a media content reception component 1345 as described with reference to FIG. 13.

At 1930, the method may include transmitting a first stream of media content to the first wearable device via the first session flow. The operations of block 1930 may be performed in accordance with examples as disclosed herein. In some examples, aspects of the operations of 1930 may be performed by a media content transmission component 1335 as described with reference to FIG. 13.

At 1935, the method may include transmitting a second stream of media content to the second wearable device via the second session flow in coordination with the first stream of media content. The operations of block 1935 may be performed in accordance with examples as disclosed herein. In some examples, aspects of the operations of 1935 may be performed by a media content transmission component 1335 as described with reference to FIG. 13.

FIG. 20 shows a flowchart illustrating a method 2000 that supports media communications for wearable devices in accordance with aspects of the present disclosure. The operations of the method 2000 may be implemented by a UE or its components as described herein. For example, the operations of the method 2000 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 2005, the method may include initiating, via a wireless connection between the UE and a first wearable device, a first session flow for the first wearable device, where the first session flow is associated with a second session flow for a second wearable device. The operations of block 2005 may be performed in accordance with examples as disclosed herein. In some examples, aspects of the operations of 2005 may be performed by a session flow initiation component 1325 as described with reference to FIG. 13.

At 2010, the method may include receiving, via the first session flow, a set of information associated with a user of the first wearable device. The operations of block 2010 may be performed in accordance with examples as disclosed herein. In some examples, aspects of the operations of 2010 may be performed by a user information reception component 1330 as described with reference to FIG. 13.

At 2015, the method may include receiving, via the second session flow, a set of information associated with a user of the second wearable device. The operations of block 2015 may be performed in accordance with examples as disclosed herein. In some examples, aspects of the operations of 2015 may be performed by a user information reception component 1330 as described with reference to FIG. 13.

At 2020, the method may include transmitting, to an end device, a set of aggregated information that includes the set of information associated with a user of the first wearable device and a second set of information associated with a user of the second wearable device. The operations of block 2020 may be performed in accordance with examples as disclosed herein. In some examples, aspects of the operations of 2020 may be performed by a user information transmission component 1340 as described with reference to FIG. 13.

At 2025, the method may include receiving, from the end device, aggregated media content associated with the first stream of media content and the second stream of media content. The operations of block 2025 may be performed in accordance with examples as disclosed herein. In some examples, aspects of the operations of 2025 may be performed by a media content reception component 1345 as described with reference to FIG. 13.

At 2030, the method may include transmitting a first stream of media content to the first wearable device via the first session flow. The operations of block 2030 may be performed in accordance with examples as disclosed herein. In some examples, aspects of the operations of 2030 may be performed by a media content transmission component 1335 as described with reference to FIG. 13.

At 2035, the method may include transmitting, via the first stream, a first version of the media content via the first stream of media content, where the first version includes one of a baseline version or a differential version that is defined with respect to the baseline version. The operations of block 2035 may be performed in accordance with examples as disclosed herein. In some examples, aspects of the operations of 2035 may be performed by a media content transmission component 1335 as described with reference to FIG. 13.

At 2040, the method may include transmitting a second stream of media content to the second wearable device via the second session flow in coordination with the first stream of media content. The operations of block 2040 may be performed in accordance with examples as disclosed herein. In some examples, aspects of the operations of 2040 may be performed by a media content transmission component 1335 as described with reference to FIG. 13.

The following provides an overview of aspects of the present disclosure:

Aspect 1: A method for wireless communications at a first wearable device, comprising: initiating, via a wireless connection between the first wearable device and a UE, a first session flow, wherein the first session flow is associated with a second session flow for a second wearable device; transmitting, via the first session flow, a set of information associated with a user of the first wearable device; and receiving a first stream of media content via the first session flow in coordination with a second stream of media content via the second session flow.

Aspect 2: The method of aspect 1, wherein receiving the first stream of media content comprises: receiving, via the first session flow, a first version of the media content via the first stream of media content, wherein the first version comprises one of a baseline version or a differential version that is defined with respect to the baseline version.

Aspect 3: The method of aspect 2, wherein the second stream of media content is associated with a second version of the media content, the second version comprising the other of the baseline version or the differential version.

Aspect 4: The method of any of aspects 2 through 3, wherein the baseline version is groupcast to the first wearable device and the second wearable device and the differential version is unicast to one of the first wearable device or the second wearable device.

Aspect 5: The method of any of aspects 2 through 3, wherein receiving the first stream of media content comprises: receiving, from the UE, the baseline version via a first unicast message, wherein a second version is transmitted to the second wearable device via a second unicast message.

Aspect 6: The method of any of aspects 1 through 5, wherein the first session flow and the second session flow are associated with a same session between the UE and an end device.

Aspect 7: The method of any of aspects 1 through 5, wherein the first session flow is associated with a first session with an end device, and the first session is different from a second session with the end device associated with the second session flow.

Aspect 8: The method of any of aspects 1 through 7, wherein initiating the first session flow comprises one or both of: transmitting, to the UE, a capability message indicating a capability of the first wearable device to receive the first stream of media content; or transmitting, to an end device, a SDP offer message and receiving, from the end device, a SDP answer message based at least in part on the SDP offer message.

Aspect 9: The method of any of aspects 1 through 8, wherein the set of information associated with the user comprises one or more of pose information and eye tracking information.

Aspect 10: The method of any of aspects 1 through 9, wherein the first wearable device and the second wearable device are contact lenses.

Aspect 11: The method of any of aspects 1 through 10, wherein the media content comprises rendered video for display by the first wearable device in coordination with the second wearable device.

Aspect 12: A method for wireless communications at a UE, comprising: initiating, via a wireless connection between the UE and a first wearable device, a first session flow for the first wearable device, wherein the first session flow is associated with a second session flow for a second wearable device; receiving, via the first session flow, a set of information associated with a user of the first wearable device; receiving, via the second session flow, a set of information associated with a user of the second wearable device; transmitting a first stream of media content to the first wearable device via the first session flow; and transmitting a second stream of media content to the second wearable device via the second session flow in coordination with the first stream of media content.

Aspect 13: The method of aspect 12, further comprising: transmitting, to an end device, a set of aggregated information that comprises the set of information associated with the user of the first wearable device and a second set of information associated with the user of the second wearable device; and receiving, from the end device, aggregated media content associated with the first stream of media content and the second stream of media content.

Aspect 14: The method of aspect 13, wherein transmitting the first stream of media content comprises: transmitting, via the first stream, a first version of the media content via the first stream of media content, wherein the first version comprises one of a baseline version or a differential version that is defined with respect to the baseline version.

Aspect 15: The method of aspect 14, wherein the second stream of media content is associated with a second version of the media content, the second version comprising the other of the baseline version or the differential version.

Aspect 16: The method of any of aspects 14 through 15, wherein the baseline version is groupcast to the first wearable device and the second wearable device and the differential version is unicast to one of the first wearable device or the second wearable device.

Aspect 17: The method of any of aspects 14 through 16, further comprising: receiving, from the end device, an indication of the baseline version and the differential version.

Aspect 18: The method of any of aspects 14 through 17, further comprising: receiving, from the end device, an indication of the baseline version and a second version of the media content; and generating the differential version based at least in part on receiving the indication.

Aspect 19: The method of any of aspects 14 through 15, wherein transmitting the first stream of media content comprises: transmitting the baseline version to the first wearable device via a first unicast message; and transmitting a second version of the media content to the second wearable device via a second unicast message.

Aspect 20: The method of any of aspects 12 through 19, wherein initiating the first session flow comprises: receiving, from the first wearable device, a first capability message indicating a capability of the first wearable device to receive the first stream of media content; receiving, from the second wearable device, a second capability message indicating a capability of the second wearable device to receive the second stream of media content; transmitting, to an end device, a SDP offer message based at least in part on the first capability message and the second capability message; and receiving, from the end device, a SDP answer message based at least in part on the SDP offer message.

Aspect 21: The method of any of aspects 12 through 20, wherein the first session flow and the second session flow are associated with a same session between the UE and an end device.

Aspect 22: The method of any of aspects 12 through 21, wherein the set of information associated with the user comprises one or more of pose information and eye tracking information.

Aspect 23: The method of any of aspects 12 through 22, wherein the first wearable device and the second wearable device are contact lenses.

Aspect 24: The method of any of aspects 12 through 23, wherein the media content comprises rendered video for display by the first wearable device in coordination with the second wearable device.

Aspect 25: An apparatus for wireless communications at a first wearable device, comprising at least one processor; at least one memory coupled with the at least one processor; and instructions stored in the at least one memory and executable by the at least one processor to cause the apparatus to perform a method of any of aspects 1 through 11.

Aspect 26: An apparatus for wireless communications at a first wearable device, comprising at least one means for performing a method of any of aspects 1 through 11.

Aspect 27: A non-transitory computer-readable medium storing code for wireless communications at a first wearable device, the code comprising instructions executable by at least one processor to perform a method of any of aspects 1 through 11.

Aspect 28: An apparatus for wireless communications at a UE, comprising at least one processor; at least one memory coupled with the at least one processor; and instructions stored in the at least one memory and executable by the at least one processor to cause the apparatus to perform a method of any of aspects 12 through 24.

Aspect 29: An apparatus for wireless communications at a UE, comprising at least one means for performing a method of any of aspects 12 through 24.

Aspect 30: A non-transitory computer-readable medium storing code for wireless communications at a UE, the code comprising instructions executable by at least one processor to perform a method of any of aspects 12 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory)

and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first contact lens, comprising:
at least one processor;
at least one memory coupled with the at least one processor; and
instructions stored in the at least one memory and executable by the at least one processor to cause the apparatus to:
transmit, to an end device and via a wireless connection between the first contact lens and a user equipment (UE), a session description protocol offer message that initiates a first real-time transport protocol session between the first contact lens and the UE, wherein the first real-time transport protocol session is associated with and different from a second real-time transport protocol session between a second contact lens and the UE, wherein both the first real-time transport protocol session and the second real-time transport protocol session are associated with a third real-time transport protocol session between the UE and the end device, wherein the first contact lens is physically and electrically separate from the second contact lens, wherein the first contact lens and the second contact lens have no energy storage capability;
receive, from the end device and in response to the session description protocol offer message, a session description protocol answer message, wherein receiving the session description protocol answer message is indicative of a second session description protocol offer message associated with the second contact lens;
transmit, via the first real-time transport protocol session, a set of information associated with a user of the first contact lens; and
receive a first version of media content via a first stream of the media content via the first real-time transport protocol session in coordination with a second version of media content via a second stream of the media content via the second real-time transport protocol session, wherein the first version comprises:
a baseline version including a first rendered video, wherein the baseline version is groupcast to the first contact lens and the second contact lens; and
a differential version comprising a delta between the first rendered video and a second rendered video that is associated with the second stream of the media content, wherein the differential version is unicast to the first contact lens.

2. The apparatus of claim 1, wherein the set of information associated with the user comprises one or more of pose information and eye tracking information.

3. The apparatus of claim 1, wherein the media content comprises rendered video for display by the first contact lens in coordination with the second contact lens.

4. An apparatus for wireless communications at a user equipment (UE), comprising:
at least one processor;
at least one memory coupled with the at least one processor; and
instructions stored in the at least one memory and executable by the at least one processor to cause the apparatus to:
receive, via a wireless connection between the UE and a first contact lens, a message that initiates a first real-time transport protocol session for the first contact lens, wherein the first real-time transport protocol session is associated with and different from a second real-time transport protocol session between a second contact lens and the UE, wherein both the first real-time transport protocol session and the second real-time transport protocol session are associated with a third real-time transport protocol session between the UE and an end device, wherein the first contact lens is physically and electrically separate from the second contact lens, wherein the first contact lens and the second contact lens have no energy storage capability;
transmit, to the end device and based at least in part on receiving the message, a session description protocol offer message associated with initiating the first real-time transport protocol session;
receive, from the end device and in response to the session description protocol offer message, a session description protocol answer message associated with initiating the first real-time transport protocol session;
receive, from the first contact lens wearable device and via the first real-time transport protocol session, a first set of information associated with a user of the first contact lens and the second contact lens;
receive, from the second contact lens and via the second real-time transport protocol session, a second set of information associated with the user;
transmit a first version of media content via a first stream of the media content to the first contact lens via the first real-time transport protocol session, wherein the first version comprises a baseline version including a first rendered video; and transmit a second version of media content via a second stream of the media content to the second contact lens via the second real-time transport protocol session in coordination with the first stream of media content, wherein the second version comprises the baseline version including the first rendered video and a differential version that includes a delta between the first rendered video and a second rendered video that is associated with the second stream of the media content, wherein the baseline version is groupcast to the first contact lens and the second contact lens and the differential version is unicast to the second contact lens.

5. The apparatus of claim 4, wherein the instructions are further executable by the at least one processor to cause the apparatus to:

transmit, to the end device, a set of aggregated information that comprises the first set of information associated with the user and the second set of information associated with the user; and receive, from the end device, aggregated media content associated with the first stream of media content and the second stream of media content.

6. The apparatus of claim 4, wherein the instructions are further executable by the at least one processor to cause the apparatus to:

receive, from the end device, an indication of the baseline version and the differential version.

7. The apparatus of claim 4, wherein the instructions are further executable by the at least one processor to cause the apparatus to:

receive, from the end device, an indication of the baseline version and the second version of the media content; and generate the differential version based at least in part on receiving the indication.

8. The apparatus of claim 4, wherein the message comprises a first capability message indicating a capability of the first contact lens to receive the first stream of media content and wherein the instructions are executable by the at least one processor to cause the apparatus to:

receive, from the second contact lens, a second capability message indicating a capability of the second contact lens to receive the second stream of media content, wherein transmitting the session description protocol offer message is based at least in part on receiving the second capability message.

9. The apparatus of claim 4, wherein the first set of information associated with the user, the second set of information associated with the user, or both, comprises one or more of pose information and eye tracking information.

10. The apparatus of claim 4, wherein the media content comprises rendered video for display by the first contact lens in coordination with the second contact lens.

11. A method for wireless communications at a first contact lens, comprising:

transmitting, to an end device and via a wireless connection between the first contact lens and a user equipment (UE), a session description protocol offer message that initiates a first real-time transport protocol session between the first contact lens and the UE, wherein the first real-time transport protocol session is associated with and different from a second real-time transport protocol session between a second contact lens and the UE, wherein both the first real-time transport protocol session and the second real-time transport protocol session are associated with a third real-time transport protocol session between the UE and the end device, wherein the first contact lens is physically and electrically separate from the second contact lens, wherein the first contact lens and the second contact lens have no energy storage capability;

receiving, from the end device and in response to the session description protocol offer message, a session description protocol answer message, wherein receiving the session description protocol answer message is indicative of a second session description protocol offer message associated with the second contact lens;

transmitting, via the first real-time transport protocol session, a set of information associated with a user of the first contact lens; and receiving a first version of media content via a first stream of the media content via the first real-time transport protocol session in coordination with a second version of media content via a second stream of the media content via the second real-time transport protocol session, wherein the first version comprises:

a baseline version including a first rendered video, wherein the baseline version is groupcast to the first contact lens and the second contact lens; and a differential version comprising a delta between the first rendered video and a second rendered video that is associated with the second stream of the media content, wherein the differential version is unicast to the first contact lens.

12. A method for wireless communications at a user equipment (UE), comprising:

receiving, via a wireless connection between the UE and a first contact lens, a message that initiates a first real-time transport protocol session for the first contact lens, wherein the first real-time transport protocol session is associated with and different from a second real-time transport protocol session between a second contact lens and the UE, wherein both the first real-time transport protocol session and the second real-time transport protocol session are associated with a third real-time transport protocol session between the UE and an end device, wherein the first contact lens is physically and electrically separate from the second contact lens wearable device, wherein the first contact lens and the second contact lens have no energy storage capability;

transmitting, to the end device and based at least in part on receiving the message, a session description protocol offer message associated with initiating the first real-time transport protocol session;

receiving, from the end device and in response to the session description protocol offer message, a session description protocol answer message associated with initiating the first real-time transport protocol session;

receiving, from the first contact lens and via the first real-time transport protocol session, a first set of information associated with a user of the first contact lens and the second contact lens;

receiving, from the second contact lens and via the second real-time transport protocol session, a second set of information associated with the user;

transmitting a first version of media content via a first stream of the media content to the first contact lens via the first real-time transport protocol session, wherein the first version comprises a baseline version including a first rendered video; and transmitting a second version of media content via a second stream of the media content to the second contact lens via the second real-time transport protocol session in coordination with the first stream of media content, wherein the second version comprises the baseline version including the first rendered video and a differential version that includes a delta between the first rendered video and a second rendered video that is associated with the second stream of the media content, wherein the baseline version is groupcast to the first contact lens and the second contact lens and the differential version is unicast to the second contact lens.

13. The method of claim 12, further comprising:

transmitting, to the end device, a set of aggregated information that comprises the first set of information associated with the user and the second set of information associated with the user; and receiving, from the end device, aggregated media content associated with the first stream of media content and the second stream of media content.

\* \* \* \* \*